United States Patent
Napau et al.

(10) Patent No.: US 11,760,233 B2
(45) Date of Patent: Sep. 19, 2023

(54) ULTRA-COMPACT POWER LENGTH ADJUSTER WITH ANTI-BACK DRIVE CAPABILITY AND PINION-RACK OUTPUT FOR A VEHICLE SEAT

(71) Applicant: FISHER & COMPANY, INCORPORATED, St. Clair Shores, MI (US)

(72) Inventors: Mircea Napau, Sterling Heights, MI (US); Doina Napau, Sterling Heights, MI (US); Ileana Dacia Napau, Cugir (RO); Radu Calin Napau-Stoica, Lupeni (RO); Ioan Napau, Rochester Hills, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 459 days.

(21) Appl. No.: 16/787,420

(22) Filed: Feb. 11, 2020

(65) Prior Publication Data
US 2020/0262317 A1 Aug. 20, 2020

Related U.S. Application Data

(60) Provisional application No. 62/807,983, filed on Feb. 20, 2019.

(51) Int. Cl.
*B60N 2/06* (2006.01)
*B60N 2/08* (2006.01)

(52) U.S. Cl.
CPC .......... *B60N 2/067* (2013.01); *B60N 2/0825* (2013.01)

(58) Field of Classification Search
CPC ...... B60N 2/067; B60N 2/0825; B60N 2/165; B60N 2/1655; B60N 2/166; B60N 2/185;
(Continued)

(56) References Cited

U.S. PATENT DOCUMENTS 546,249 A 9/1895 Regan
657,542 A 9/1900 Ingersoll
(Continued)

FOREIGN PATENT DOCUMENTS

CN 87101620 A 9/1988
CN 1109566 A 10/1995
(Continued)

OTHER PUBLICATIONS

Translation of CN203146709U. (Year: 2013).*
(Continued)

*Primary Examiner* — Stanton L Krycinski
*Assistant Examiner* — Guang H Guan
(74) *Attorney, Agent, or Firm* — Harness, Dickey & Pierce, P.L.C.

(57) ABSTRACT

A seat adjuster drive including a stationary track that is fixed to a vehicle and a sliding track that is arranged in sliding engagement with the stationary track for movement fore and aft. A gear box, mounted to the sliding track, supports a pinion that is part of a rack and pinion drive assembly. The gear box houses a conical spiral gear set and one or more planetary gear sets. The conical spiral gear set includes a conical pinion gear that is coupled to an electric motor and a conical spiral gear that is arranged in meshing engagement with the conical pinion gear. The conical spiral gear is carried on the pinion in a sliding fit. The one or more planetary gear sets rotatably couple the conical spiral gear and the pinion through a gear reduction.

19 Claims, 26 Drawing Sheets

(58) Field of Classification Search
CPC .. B60N 2/1875; F16H 1/32; F16H 2001/2881
See application file for complete search history.

(56) References Cited

U.S. PATENT DOCUMENTS

| | | | |
|---|---|---|---|
| 978,371 A | 12/1910 | Harrison | |
| 1,192,627 A | 7/1916 | Hatlee | |
| 1,694,031 A | 12/1928 | Braren | |
| 1,770,035 A | 7/1930 | Heap et al. | |
| 2,168,164 A | 8/1939 | Kittredge | |
| 2,170,951 A | 8/1939 | Perry | |
| 2,250,259 A | 7/1941 | Foote, Jr. | |
| 2,475,504 A | 7/1949 | Jackson | |
| 2,508,121 A | 5/1950 | McIver | |
| 2,609,713 A | 9/1952 | Martin | |
| 2,972,910 A | 2/1961 | Menge, Sr. | |
| 2,995,226 A | 8/1961 | Gilder | |
| 3,013,447 A | 12/1961 | Hils et al. | |
| 3,037,400 A | 6/1962 | Sundt | |
| 3,144,791 A | 8/1964 | Menge, Sr. | |
| 3,319,482 A | 5/1967 | Campbell et al. | |
| 3,427,901 A | 2/1969 | Wildhaber | |
| 3,451,290 A | 6/1969 | Wildhaber | |
| 3,965,773 A | 6/1976 | Bert et al. | |
| 4,023,441 A | 5/1977 | Osterwalder | |
| 4,228,698 A | 10/1980 | Winiasz | |
| 4,228,739 A | 10/1980 | Fitzgibbon | |
| 4,269,075 A | 5/1981 | Crist et al. | |
| 4,452,102 A | 6/1984 | Shaffer | |
| 4,720,073 A | 1/1988 | Mann et al. | |
| 4,721,337 A | 1/1988 | Tomita | |
| 4,805,866 A | 2/1989 | Aihara et al. | |
| 4,884,844 A | 12/1989 | Kershaw et al. | |
| 4,930,367 A | 6/1990 | Nagasawa | |
| 4,967,615 A | 11/1990 | Mills | |
| 5,030,184 A | 7/1991 | Rennerfelt | |
| 5,094,420 A | 3/1992 | Aihara et al. | |
| 5,099,717 A | 3/1992 | Ochial et al. | |
| 5,222,402 A | 6/1993 | White et al. | |
| 5,259,257 A | 11/1993 | Mouri | |
| 5,292,164 A | 3/1994 | Rees | |
| 5,314,158 A | 5/1994 | Mouri | |
| 5,349,878 A | 9/1994 | White et al. | |
| 5,425,683 A | 6/1995 | Bang | |
| 5,505,668 A | 4/1996 | Koriakov-Savoysky et al. | |
| 5,598,746 A | 2/1997 | Chen | |
| 5,701,783 A | 12/1997 | Lin | |
| 5,816,555 A | 10/1998 | Ito et al. | |
| 5,865,506 A | 2/1999 | Sakamoto | |
| 6,032,550 A | 3/2000 | Rugh | |
| 6,138,974 A | 10/2000 | Okada et al. | |
| D437,334 S | 2/2001 | Song | |
| 6,220,642 B1 | 4/2001 | Ito et al. | |
| 6,260,672 B1 | 7/2001 | Frohnhaus et al. | |
| 6,260,922 B1 | 7/2001 | Frohnhaus et al. | |
| 6,261,199 B1 | 7/2001 | Schlangen | |
| 6,322,146 B1 | 11/2001 | Fisher, Jr. | |
| 6,548,332 B2 | 4/2003 | Peng et al. | |
| 6,742,409 B2 | 6/2004 | Blanchard | |
| 6,915,998 B2 | 7/2005 | Borbe et al. | |
| 7,041,024 B2 | 5/2006 | Becker et al. | |
| 7,048,244 B2 | 5/2006 | Hauck | |
| 7,051,986 B1 | 5/2006 | Taubmann et al. | |
| 7,143,513 B2 | 12/2006 | Taubmann et al. | |
| 7,198,243 B2 | 4/2007 | Hofschulte et al. | |
| 7,313,982 B2 | 1/2008 | Wisner et al. | |
| 7,322,257 B2 | 1/2008 | Becker et al. | |
| 7,340,974 B2 | 3/2008 | Landskron et al. | |
| 7,437,962 B2 | 10/2008 | Taubmann et al. | |
| 7,571,666 B2 | 8/2009 | Borbe et al. | |
| 7,703,347 B2 | 4/2010 | Porinsky et al. | |
| 7,887,020 B2 | 2/2011 | Ferguson et al. | |
| 8,061,228 B2 | 11/2011 | Becker et al. | |
| 8,087,974 B2 | 1/2012 | Maeda et al. | |
| 8,113,074 B2 | 2/2012 | Wohrle et al. | |
| 8,128,051 B2 | 3/2012 | Koga et al. | |
| 8,171,823 B2 | 5/2012 | Koga et al. | |
| 8,453,529 B2 | 6/2013 | Birker et al. | |
| 8,485,489 B2 | 7/2013 | Hofshulte et al. | |
| 8,777,794 B2* | 7/2014 | Oishi | H02K 7/1166 475/162 |
| 8,826,756 B2 | 9/2014 | Hoffmann et al. | |
| 8,864,231 B2 | 10/2014 | Shimode et al. | |
| 8,904,895 B2 | 12/2014 | Woehrle et al. | |
| 9,180,795 B2 | 11/2015 | Flieger et al. | |
| 9,205,763 B2 | 12/2015 | Anticuar et al. | |
| 9,415,713 B2 | 8/2016 | Line et al. | |
| 9,421,891 B2* | 8/2016 | Andres | B60N 2/0232 |
| 9,689,464 B2 | 6/2017 | Hamakita | |
| 9,694,724 B2 | 7/2017 | Nagata et al. | |
| 9,827,879 B2 | 11/2017 | Fujita et al. | |
| 9,902,295 B2 | 2/2018 | Napau et al. | |
| 10,021,991 B2* | 7/2018 | Klimm | F16H 19/04 |
| 10,024,392 B2 | 7/2018 | Napau et al. | |
| 10,195,975 B2 | 2/2019 | Becker et al. | |
| 10,208,835 B2* | 2/2019 | Noguchi | F16H 1/16 |
| 10,220,730 B2 | 3/2019 | Nagata et al. | |
| 10,220,732 B2* | 3/2019 | Auer | B60N 2/123 |
| 10,300,812 B2 | 5/2019 | Flieger et al. | |
| 10,486,554 B2 | 11/2019 | Napau et al. | |
| 10,500,984 B2* | 12/2019 | Hoffmann | B60N 2/166 |
| 10,562,411 B2* | 2/2020 | Higuchi | B60N 2/0232 |
| 10,737,591 B2 | 8/2020 | Ito | |
| 10,843,591 B2 | 11/2020 | Becker et al. | |
| 10,857,910 B2* | 12/2020 | Madhu | B60N 2/123 |
| 10,933,771 B2 | 3/2021 | Geiges et al. | |
| 10,953,772 B2 | 3/2021 | Napau et al. | |
| 11,180,064 B2* | 11/2021 | Navatte | F16H 57/03 |
| 11,273,506 B2 | 3/2022 | Napau et al. | |
| 11,485,255 B2 | 11/2022 | Napau et al. | |
| 11,529,892 B2 | 12/2022 | Napau et al. | |
| 2004/0206195 A1 | 10/2004 | Landskron et al. | |
| 2004/0221670 A1 | 11/2004 | Becker et al. | |
| 2004/0254041 A1 | 12/2004 | Becker et al. | |
| 2005/0082890 A1 | 4/2005 | Taubmann et al. | |
| 2005/0116132 A1 | 6/2005 | Sakamaki | |
| 2005/0126333 A1 | 6/2005 | Dohles et al. | |
| 2005/0146174 A1 | 7/2005 | Maddelein et al. | |
| 2005/0253036 A1 | 11/2005 | Li et al. | |
| 2005/0269478 A1 | 12/2005 | Woehrle et al. | |
| 2006/0084547 A1 | 4/2006 | Dill et al. | |
| 2006/0117885 A1 | 6/2006 | Robson et al. | |
| 2006/0213302 A1 | 9/2006 | Hoffmann et al. | |
| 2006/0249644 A1 | 11/2006 | Folliot et al. | |
| 2007/0029893 A1 | 2/2007 | Schuler et al. | |
| 2007/0108360 A1 | 5/2007 | Ito et al. | |
| 2007/0209857 A1 | 9/2007 | Wolf | |
| 2007/0241602 A1 | 10/2007 | Thiel et al. | |
| 2008/0261743 A1 | 10/2008 | Junkers | |
| 2009/0045661 A1 | 2/2009 | Stoessel et al. | |
| 2010/0139425 A1 | 6/2010 | Schulz et al. | |
| 2010/0237216 A1 | 9/2010 | Napau et al. | |
| 2010/0320352 A1 | 12/2010 | Weber | |
| 2011/0079699 A1 | 4/2011 | Tarusawa et al. | |
| 2011/0308340 A1 | 12/2011 | Bosecker et al. | |
| 2012/0325033 A1 | 12/2012 | Bosecker et al. | |
| 2013/0180348 A1 | 7/2013 | Andres et al. | |
| 2013/0333496 A1 | 12/2013 | Boutouil et al. | |
| 2014/0238188 A1 | 8/2014 | Ito | |
| 2015/0020955 A1 | 1/2015 | Hoffmann et al. | |
| 2015/0210187 A1 | 7/2015 | Harleb et al. | |
| 2015/0283924 A1 | 10/2015 | Boutouil et al. | |
| 2015/0360587 A1 | 12/2015 | Hoffmann et al. | |
| 2016/0257223 A1 | 9/2016 | Markel et al. | |
| 2016/0341214 A1 | 11/2016 | O'Toole et al. | |
| 2017/0059017 A1 | 3/2017 | Napau et al. | |
| 2017/0203677 A1 | 7/2017 | Becker et al. | |
| 2017/0253145 A1 | 9/2017 | Runde et al. | |
| 2017/0307053 A1 | 10/2017 | Riester et al. | |
| 2018/0065507 A1 | 3/2018 | Napau et al. | |
| 2018/0201158 A1 | 7/2018 | Hoffmann | |
| 2018/0334054 A1 | 11/2018 | Higuchi et al. | |
| 2019/0152347 A1 | 5/2019 | Becker et al. | |
| 2019/0202322 A1 | 7/2019 | Napau et al. | |

(56) References Cited

U.S. PATENT DOCUMENTS

| | | | |
|---|---|---|---|
| 2020/0215936 | A1 | 7/2020 | Teer et al. |
| 2020/0262317 | A1* | 8/2020 | Napau ............... B60N 2/0232 |
| 2021/0016375 | A1 | 1/2021 | Napau et al. |
| 2021/0252997 | A1* | 8/2021 | Gropp ................. B60N 2/015 |

FOREIGN PATENT DOCUMENTS

| | | | |
|---|---|---|---|
| CN | 1251411 A | 4/2000 | |
| CN | 1309750 A | 8/2001 | |
| CN | 101178116 A | 5/2008 | |
| CN | 101448674 A | 6/2009 | |
| CN | 201350516 Y | 11/2009 | |
| CN | 101970900 A | 2/2011 | |
| CN | 102510817 A | 6/2012 | |
| CN | 101528502 B | 8/2012 | |
| CN | 103095041 A | 5/2013 | |
| CN | 103101455 A | 5/2013 | |
| CN | 203146709 U | 8/2013 | |
| CN | 103498891 A | 1/2014 | |
| CN | 204226562 U | 3/2015 | |
| CN | 104520140 A | 4/2015 | |
| CN | 104802666 A | 7/2015 | |
| CN | 204774719 U | 11/2015 | |
| CN | 204774722 U | 11/2015 | |
| CN | 105270212 A | 1/2016 | |
| CN | 105599643 A | 5/2016 | |
| CN | 107804196 A | 3/2018 | |
| CN | 207078030 U | 3/2018 | |
| CN | 208306408 U | 1/2019 | |
| CN | 208324966 U | 1/2019 | |
| CN | 109538741 A | 3/2019 | |
| CN | 110475691 A | 11/2019 | |
| DE | 1755740 A1 | 1/1972 | |
| DE | 3107455 A1 | 10/1982 | |
| DE | 19815283 A1 | 10/1999 | |
| DE | 19861100 A1 | 2/2000 | |
| DE | 19911432 A1 | 9/2000 | |
| DE | 10139631 A1 | 3/2003 | |
| DE | 10250994 A1 | 8/2003 | |
| DE | 10247204 A1 | 4/2004 | |
| DE | 10203983 B4 | 5/2004 | |
| DE | 10327103 A1 | 12/2004 | |
| DE | 102004013543 A1 | 10/2005 | |
| DE | 102005044467 B3 | 3/2007 | |
| DE | 202008016335 U1 | 3/2009 | |
| DE | 102009006815 A1 | 8/2009 | |
| DE | 102013009846 A1 | 12/2013 | |
| DE | 10362326 B4 | 2/2014 | |
| DE | 102015205440 A1 | 9/2016 | |
| DE | 102017100934 A1 | 7/2017 | |
| DE | 102017008036 A1 | 3/2018 | |
| EP | 0450324 A2 | 10/1991 | |
| EP | 0617213 A1 | 9/1994 | |
| EP | 0848672 B1 | 12/1999 | |
| EP | 0992711 A2 | 4/2000 | |
| EP | 1068093 A1 | 1/2001 | |
| EP | 1167113 A1 | 1/2002 | |
| EP | 1026027 B1 | 3/2004 | |
| EP | 1442923 A2 | 8/2004 | |
| EP | 1601550 B1 | 10/2012 | |
| FR | 679410 A | 4/1930 | |
| FR | 2517018 A3 | 5/1983 | |
| FR | 2872747 A1 | 1/2006 | |
| FR | 2882975 A1 | 9/2006 | |
| GB | 2389066 A | 12/2003 | |
| GB | 2404704 A | 2/2005 | |
| JP | S62184939 A | 8/1987 | |
| JP | H08197988 A | 8/1996 | |
| JP | 2010112553 A | 5/2010 | |
| JP | 2015134513 A | 7/2015 | |
| JP | 2018203208 A | 12/2018 | |
| KR | 20090071616 A | 7/2009 | |
| KR | 101470180 B1 | 12/2014 | |
| KR | 101501384 B1 | 3/2015 | |
| KR | 101518647 B1 | 5/2015 | |
| KR | 101708126 B1 | 2/2017 | |
| WO | WO-8606036 A1 | 10/1986 | |
| WO | WO-9709192 A1 | 3/1997 | |
| WO | WO-03074209 A2 | 9/2003 | |
| WO | WO-2009092946 A2 | 7/2009 | |
| WO | WO-2010116125 A1 | 10/2010 | |
| WO | WO-2011098161 A1 | 8/2011 | |
| WO | WO-2011137989 A1 | 11/2011 | |
| WO | WO-2012150050 A1 | 11/2012 | |
| WO | WO-2013010888 A2 | 1/2013 | |
| WO | WO-2015161714 A1 | 10/2015 | |
| WO | WO-2018221977 A1 | 12/2018 | |

OTHER PUBLICATIONS

Office Action regarding German Patent Application No. 1020170080364, dated May 24, 2022.

Office Action for U.S. Appl. No. 16/737,991, dated May 27, 2022.

U.S. Appl. No. 16/260,782, filed Jan. 29, 2019, Burckhard Becker et al.

U.S. Appl. No. 16/299,384, filed Mar. 12, 2019, Mircea Napau et al.

U.S. Appl. No. 16/737,991, filed Jan. 9, 2020, Antal Teer et al.

Office Action regarding German Patent Application No. 102020200205.3, dated Aug. 20, 2020. Partial translation provided by Bardehle Pagenberg Partnerschaft mbB.

Office Action regarding Chinese Patent Application No. 202010075280.8 dated Nov. 26, 2021.

Office Action regarding German Patent Application No. 112019000026.8, dated Sep. 25, 2020. Partial translation provided by Bardehle Pagenberg Partnerschaft mbB.

Office Action regarding German Patent Application No. 102017100934.5, dated Jan. 27, 2021. Translation provided by Witte, Weller & Partner Patentanwälte mbB.

Office Action regarding Korean Patent Application No. 10-2019-7026939, dated Feb. 19, 2021. Translation provided by Koryo IP & Law.

Office Action for U.S. Appl. No. 17/062,931, dated Sep. 9, 2021.

Dicker Jr. et al., "Worms and Worm Gears." Theory of Machines and Mechanisms, 3rd ed., Oxford University Press, 2003, pp. 306-310.

International Search Report regarding International Application No. PCT/US2020/012857, dated Apr. 29, 2020.

Written Opinion of the International Searching Authority regarding International Application No. PCT/US2020/012857, dated Apr. 29, 2020.

Office Action regarding German Patent Application No. 102017008036.4, dated Apr. 5, 2018.

Office Action regarding Korean Patent Application No. 10-2017-0114314, dated Sep. 28, 2018.

Office Action regarding Korean Patent Application No. 10-2017-0114314, dated Mar. 27, 2019.

Office Action regarding Chinese Patent Application No. 201710791607.X, dated Aug. 5, 2019.

Office Action regarding Korean Patent Application No. 10-2017-0114314, dated Sep. 9, 2019.

Office Action regarding Chinese Patent Application No. 201710791607.X, dated Apr. 21, 2020.

Office Action regarding German Patent Application No. 102017008036.4, dated Jul. 17, 2020.

Office Action regarding Chinese Patent Application No. 201710791607.X, dated Dec. 22, 2020.

Office Action regarding Chinese Patent Application No. 202010104705.3 dated Feb. 7, 2022.

Notice of Allowance regarding U.S. Appl. No. 17/236,639 dated Apr. 18, 2022.

Office Action regarding Chinese Patent Application No. 2020101047053, dated Jul. 14, 2022.

International Search Report regarding International Application No. PCT/US2016/048649, dated Nov. 28, 2016.

Written Opinion of the International Searching Authority regarding International Application No. PCT/US2016/048649, dated Nov. 28, 2016.

(56) References Cited

OTHER PUBLICATIONS

International Search Report regarding International Application No. PCT/US2016/048634, dated Dec. 21, 2016.
Written Opinion of the International Searching Authority regarding International Application No. PCT/US2016/048634, dated Dec. 21, 2016.
International Search Report regarding International Application No. PCT/US2019/021870, dated Jun. 25, 2019.
Written Opinion of the International Searching Authority regarding International Application No. PCT/US2019/021870, dated Jun. 25, 2019.
Office Action regarding Chinese Patent Application No. 2020800083671, dated Dec. 5, 2022.
Office Action regarding Chinese Patent Application No. 2021104836972, dated Jan. 20, 2023.
Office Action regarding German Patent Application No. 1020202002053, dated Sep. 8, 2022.
Office Action regarding Chinese Patent Application No. 2020101047053, dated Oct. 27, 2022.
Office Action regarding German Patent Application No. 1020170080364, dated May 17, 2022.
Non-Final Office Action regarding U.S. Appl. No. 17/493,287 dated Apr. 18, 2023.

* cited by examiner

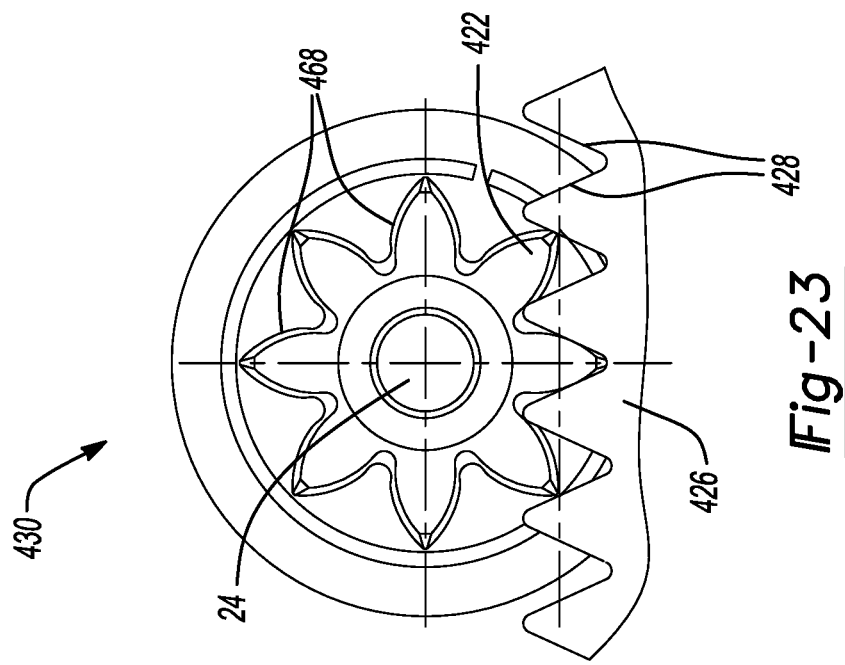
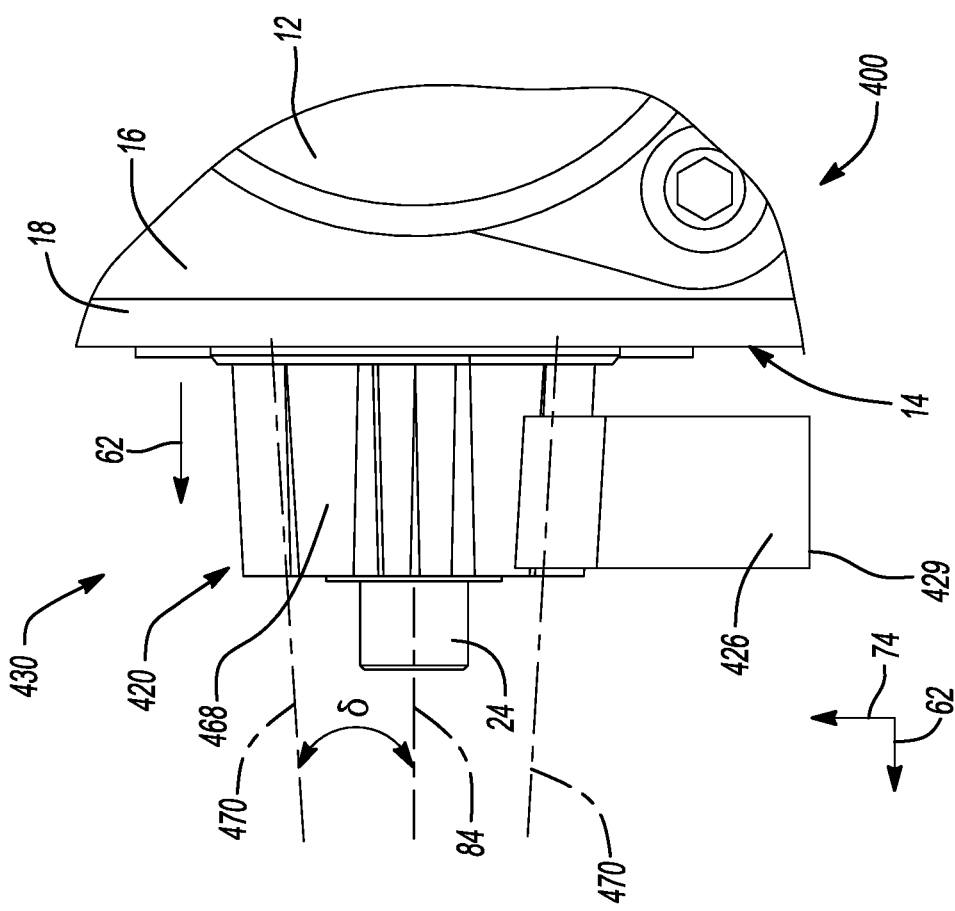

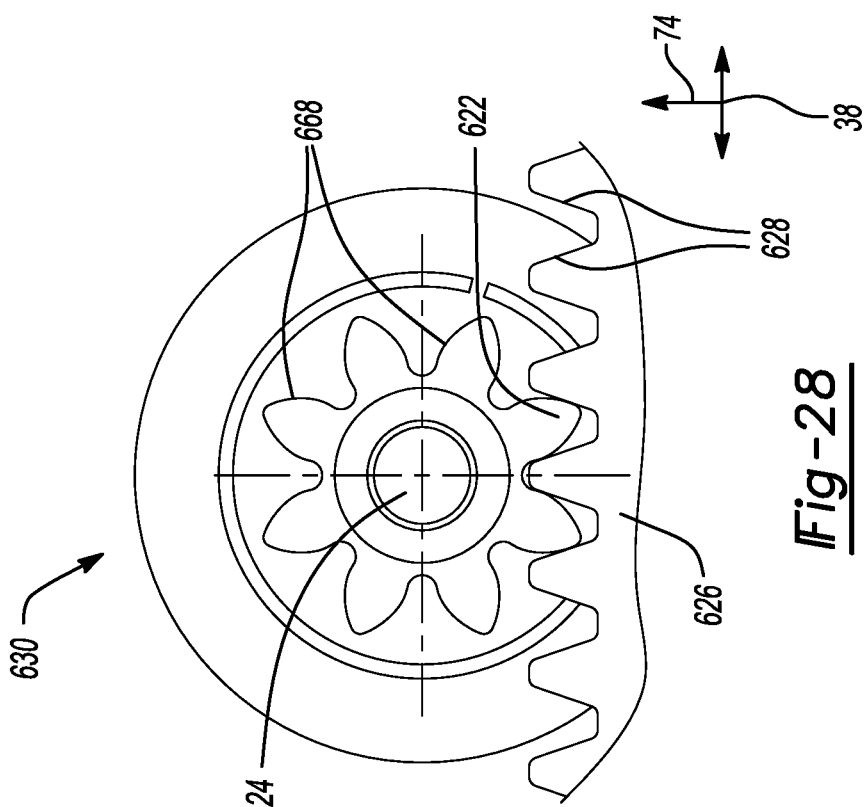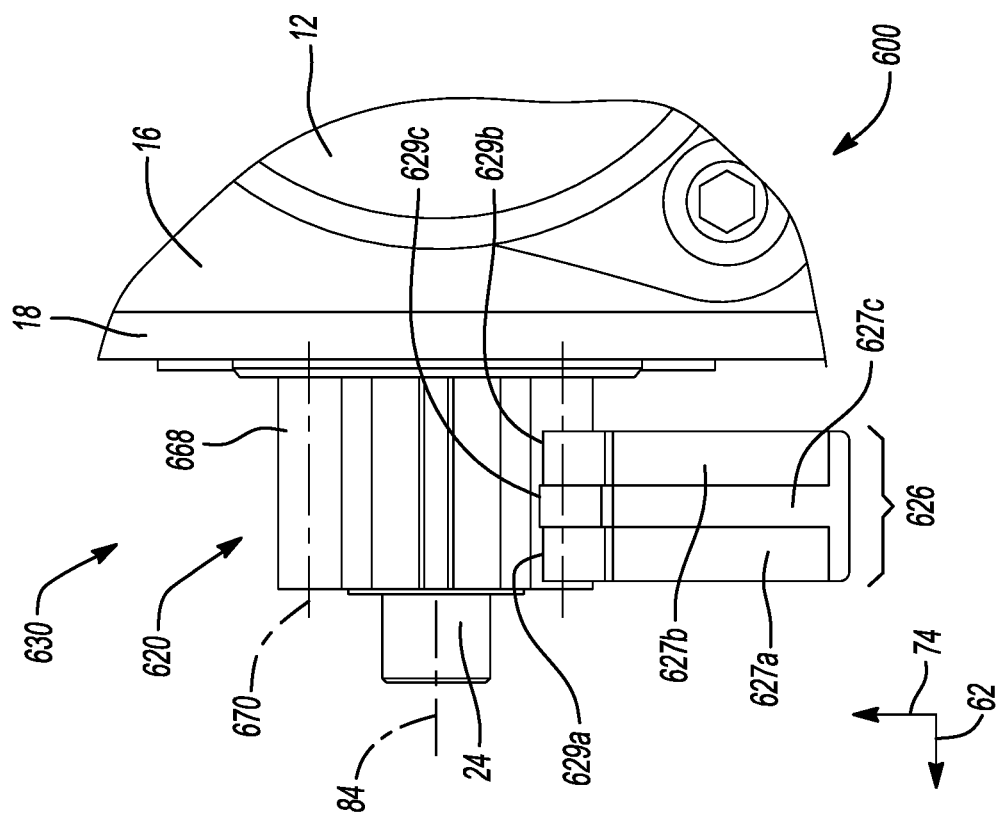

ULTRA-COMPACT POWER LENGTH ADJUSTER WITH ANTI-BACK DRIVE CAPABILITY AND PINION-RACK OUTPUT FOR A VEHICLE SEAT

CROSS-REFERENCE TO RELATED APPLICATIONS

This application claims the benefit of U.S. Provisional Application No. 62/807,983, filed on Feb. 20, 2019. The entire disclosure of the above application is incorporated herein by reference.

FIELD

The present disclosure generally relates to automotive seat adjuster drives. More specifically, rack and pinion type automotive seat adjuster drives are disclosed.

BACKGROUND

This section provides background information related to the present disclosure which is not necessarily prior art.

There are an increasing number of electrical actuators in today's vehicles. By way of example and without limitation, electrical actuators are often utilized to power vehicle seats and provide various modes of seat adjustment. Electrical actuators are driven by electric motors, the size of which is selected according to the torque it must provide to produce the required motion. Thus, if a reasonably high reduction gear ratio can be achieved in a very limited space, smaller and faster electric motors can be used to provide the same level of mechanical power needed for the required motion.

Generally speaking, gear drives used in automotive interior actuators can perform several useful functions: reduce or increase the speed, multiply or decrease the torque, and reverse the direction of rotation. In one example, automotive seat adjuster drives are gear drives that provide fore and aft seat adjustment in automotive vehicles. Automotive seat adjuster drives serve to reduce the electric motor input speed while increasing the input torque. Some of the most important requirements for automotive seat adjuster drives include: the range of reduction ratio, the range of output torque, size, weight, efficiency, the level of noise produced by the automotive seat adjuster drive, shock load capability, cost, durability, packaging size, and the amount of backlash. For some applications, such as those used in adjusting and maintaining the adjusted position of a vehicle seat, a special requirement called anti-back drive capability is also required. Anti-back drive capability may also be referred to as "non-back drive capability," "self-locking capability," or "anti-regression capability." Gear drives transfer the high speed and low torque rotation of an electric motor input shaft to low speed and high torque rotation of an output shaft, in either, a clockwise (CW) or a counter-clockwise (CCW) direction of rotation. For gear drives with anti-back drive capability, any attempt to transfer torque from the output shaft back to the input shaft by applying an external load (e.g. external reaction forces in the case of a crash accident, etc.) to the output shaft is prevented. This protects against damage to the electric motor and ensures that the vehicle seat maintains its position when the electric motor is not energized.

Gear drives with anti-back drive capabilities have been developed that multiply the torque and reduce the speed in either a clockwise or a counter-clockwise direction of rotation. Worm and worm-wheel gear drives have been used successfully for many years as a safety or self-locking device. Worm and worm-wheel gear drives avoid the need for an external brake or clutch mechanism. However, the disadvantages of worm and worm-wheel gear drives is that the required offset distance between the worm axis and the pinion axis results in a larger packaging size. The larger packaging size of worm and worm-wheel gear drives and particularly their height in the vertical direction (i.e., z-axis) makes them unsuitable for certain applications, including for example, in applications where both the seat tracks (e.g., right and left tracks) and the seat adjuster drives are packaged beneath the floor of the passenger compartment of the vehicle. Packaging constraints are further complicated in such applications where long track lengths (i.e., long seat travel lengths) and high-speed actuation modes are desired. Accordingly, there remains a need for seat adjuster drives with reduced packaging dimensions and particularly reduced height that can operate in slow and high-speed actuation modes with anti-back drive capability.

SUMMARY

This section provides a general summary of the disclosure and is not a comprehensive disclosure of its full scope or all of its features.

The subject disclosure describes several seat adjuster drives for a vehicle, such as an automobile, with reduced packaging dimensions and anti-back drive functionality. The seat adjuster drives include a stationary track that is fixed to the vehicle floor and a sliding track that is arranged in sliding engagement with the stationary track for movement in fore and aft directions, relative to the stationary track. The seat adjuster drives are therefore configured to have a vehicle seat mounted to the sliding track and a gear box mounted to the sliding track. The seat adjuster drives further include a rack and pinion drive assembly. The rack and pinion drive assembly includes a rack, which extends longitudinally along the stationary track, and a pinion. The pinion includes a pinion shaft and a gear toothed portion. The pinion shaft extends into the gear box along a pinion shaft axis. The gear toothed portion is arranged in meshing engagement with the rack teeth of the rack and pinion drive assembly such that rotation of the pinion drives the sliding track in the fore and aft directions. An electric motor is mounted to the gear box. The electric motor has an output shaft. The gear box includes a gear box housing that defines a gear box cavity therein, which houses a conical spiral gear set and one or more planetary gear sets. The conical spiral gear set includes a conical pinion gear and a conical spiral gear. The conical pinion gear is coupled to the output shaft of the electric motor such that the conical pinion gear rotates about a conical pinion gear axis. The conical spiral gear is arranged in meshing engagement with the conical pinion gear. The conical spiral gear is carried on the pinion shaft in a sliding fit. The one or more planetary gear sets rotatably couple the conical spiral gear and the pinion through a gear reduction.

The conical spiral gear set is arranged within the gear box such that the conical pinion gear axis intersects the pinion shaft axis, being orthogonally disposed relative to each other. Advantageously, this arrangement gives the seat adjuster drives an ultra-compact packaging size, particularly in the vertical direction (i.e., along the z-axis). This reduced height allows the seat adjuster drives of the present disclosure to be installed below the floor of the passenger compartment of the vehicle. Furthermore, the rack and pinion drive assembly allows the seat adjuster drives disclosed herein to be used in applications requiring long track lengths with seat travel lengths of up to 1200 millimeters in the fore and aft direction. Additionally, the seat adjuster drives of the present disclosure can be equipped with double commutator electric motors to provide a low speed (i.e., comfort) actuation mode of 11 to 26 millimeters per second and a high speed actuation mode of 45 to 60 millimeters per second. Double commutator electric motors typically have longer overall lengths making them difficult to package between the right and left tracks of seat adjuster drives. By orientating the conical pinion gear axis and therefore the electric motor in the longitudinal direction (i.e., parallel with the tracks) instead of in the transverse direction (i.e., perpendicular with the tracks), the normal packaging constraints limiting the use of double commutator electric motors are eliminated.

In addition to improved packaging and reduced height, the present disclosure provides seat adjuster drives with anti-back drive capability without the need for an external brake. In addition to these improvements, the seat adjuster drives of the present disclosure have reasonable weight, good durability, quiet operation, are easy to assemble, and have competitive manufacturing costs.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 22 is an enlarged rear elevation view of another exemplary seat adjuster drive that includes a different rack and pinion drive assembly mated to the gear box of the exemplary seat adjuster drive shown in FIG. 5;

FIG. 23 is an enlarged side elevation view of the exemplary seat adjuster drive shown in FIG. 22;

FIG. 27 is an enlarged rear elevation view of another exemplary seat adjuster drive that includes a different rack and pinion drive assembly mated to the gear box of the exemplary seat adjuster drive shown in FIG. 5, which includes a three-part rack mesh;

FIG. 28 is an enlarged side elevation view of the exemplary seat adjuster drive shown in FIG. 27.

DETAILED DESCRIPTION

Figure 1:
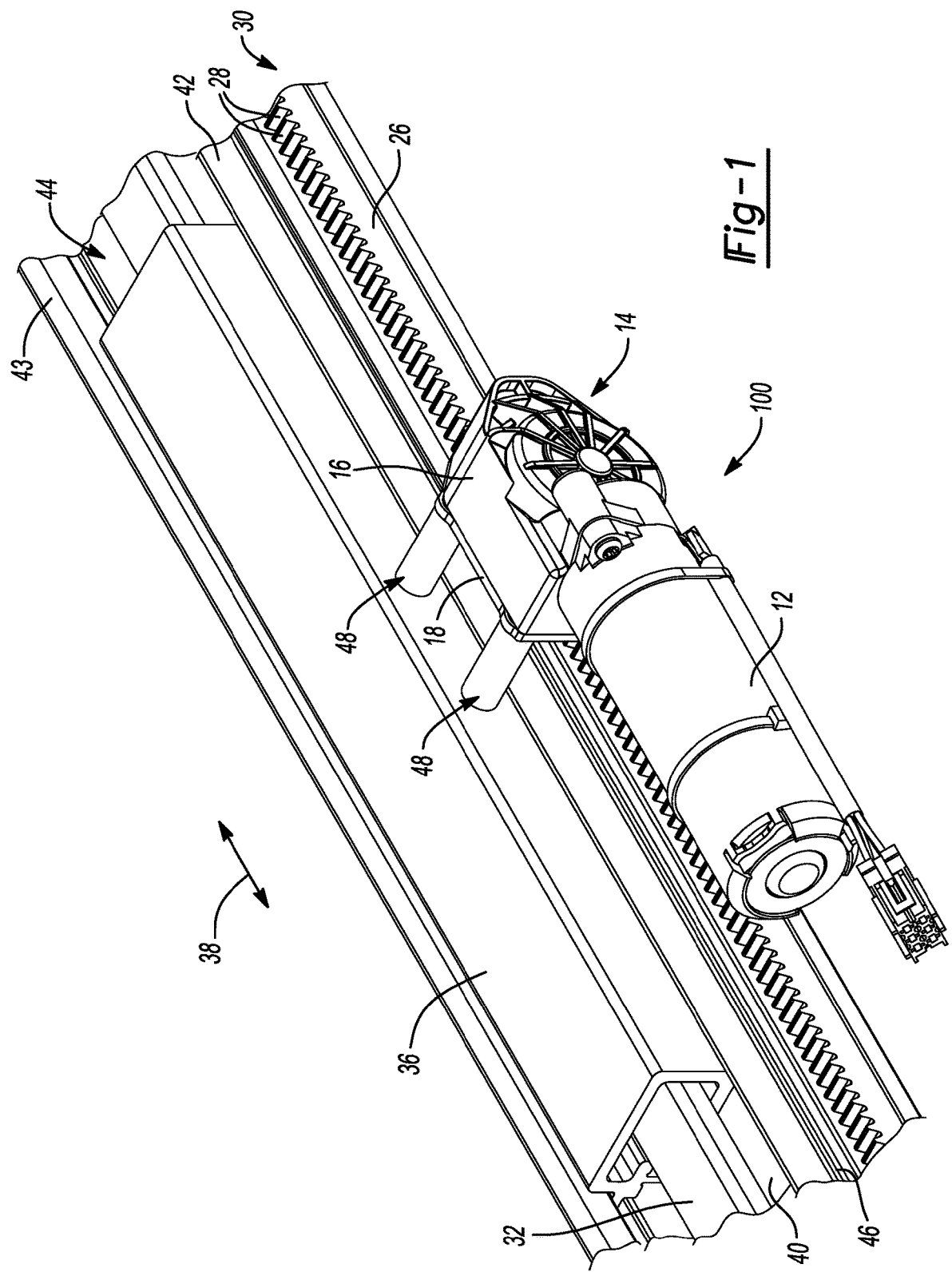
FIG. 1 is a side perspective view of an exemplary seat adjuster drive that has been constructed in accordance with the present disclosure where stationary and sliding tracks of the seat adjuster drive have been shown.

Referring to the Figures, wherein like numerals indicate corresponding parts throughout the several views, several seat adjuster drives 100, 100', 200, 200', 400, 500, 600 are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
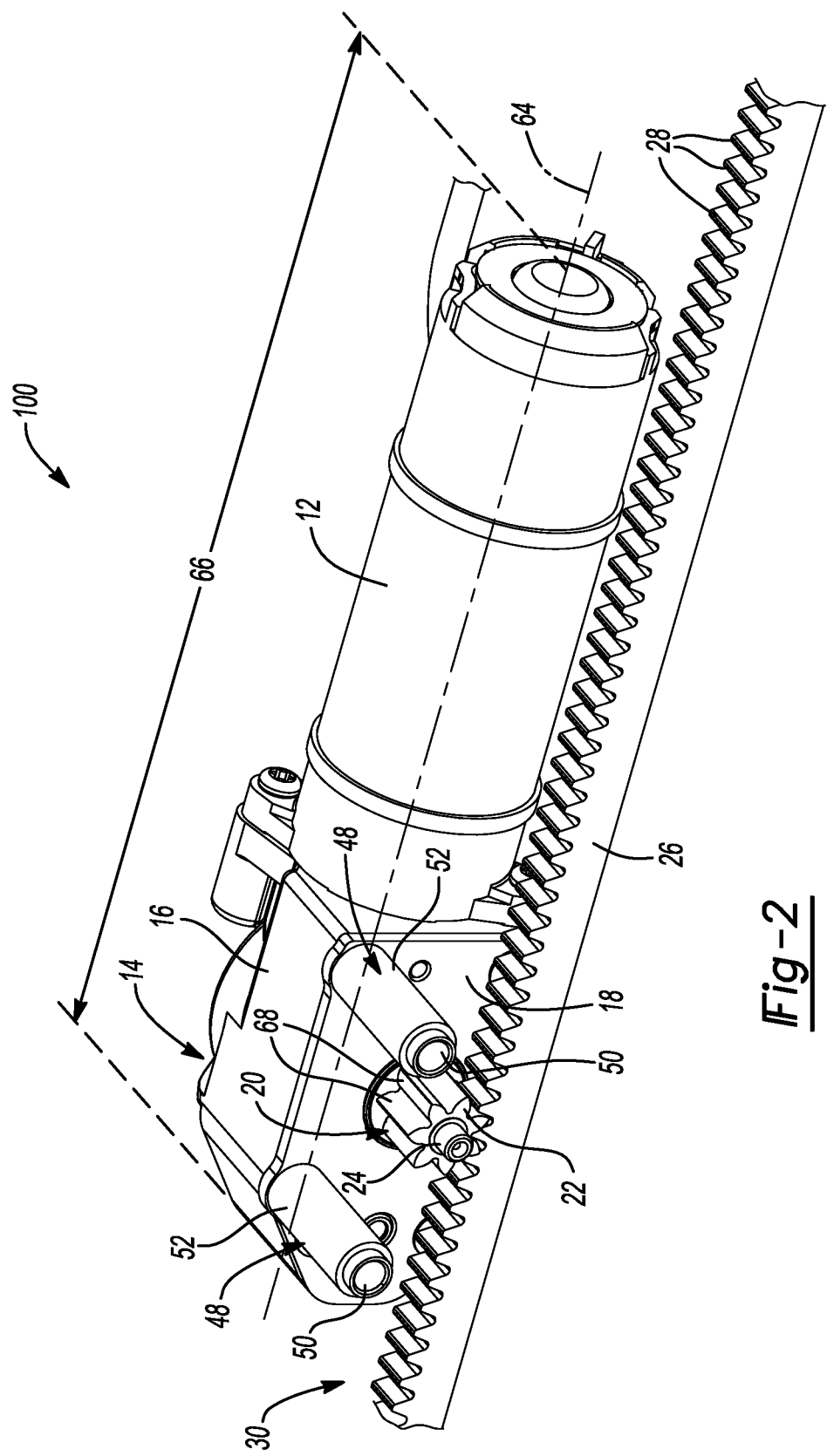
FIG. 2 is an opposite side perspective view of the seat adjuster drive shown in FIG. 1 where the stationary and sliding tracks of the seat adjuster drive have been hidden from view.

With reference to FIGS. 1 and 2, an exemplary seat adjuster drive 100 is shown. The automotive seat adjuster drive 100 includes an electric motor 12 that is mounted to a gear box 14. The gear box 14 includes a gear box housing 16 and a gear box cover 18. A pinion 20 extends out of the gear box 14 through the gear box cover 18. The pinion 20 includes a gear toothed portion 22 and an optional pinion bearing 24. The gear toothed portion 22 of the pinion 20 is arranged in meshing engagement with a rack 26, which includes a plurality of rack teeth 28. Together, the pinion 20 and the rack 26 comprise a rack and pinion drive assembly 30. The seat adjuster drive 10 also includes a stationary track 32 that is configured to be fixed to a sub-floor 34 of a vehicle (see FIG. 5), such as an automobile, and a sliding track 36 that is arranged in sliding engagement with the stationary track 32 for movement in fore and aft directions 38 (i.e., towards the front of the vehicle and towards the rear of the vehicle). The stationary track 32 includes a bottom wall 40 and first and second side walls 42, 43 that extend upwardly from the bottom wall 40 to define a track channel 44 that receives at least part of the sliding track 36. The pinion bearing 24 is received in a slot 46 in the first side wall 42 of the stationary track 32, which helps support the pinion 20 and resists pinion deflection. In FIGS. 1 and 2, the rack 26 of the rack and pinion drive assembly 30 extends longitudinally along the stationary track 32 at a position that is external to the track channel 44 and directly adjacent to the first side wall 42. The gear box 14 is mounted to the sliding track 36 by a pair of mounting studs 48. Each of the mounting studs 48 includes a fastener 50 that is received inside an outer sleeve 52. Rotational power from the electric motor 12 is transferred through the gear box 14 to rotate the pinion 20, which operates to drive the electric motor 12, gear box 14, and sliding track 36 in the fore and aft directions 38 relative to the stationary track 32.

Figure 3:
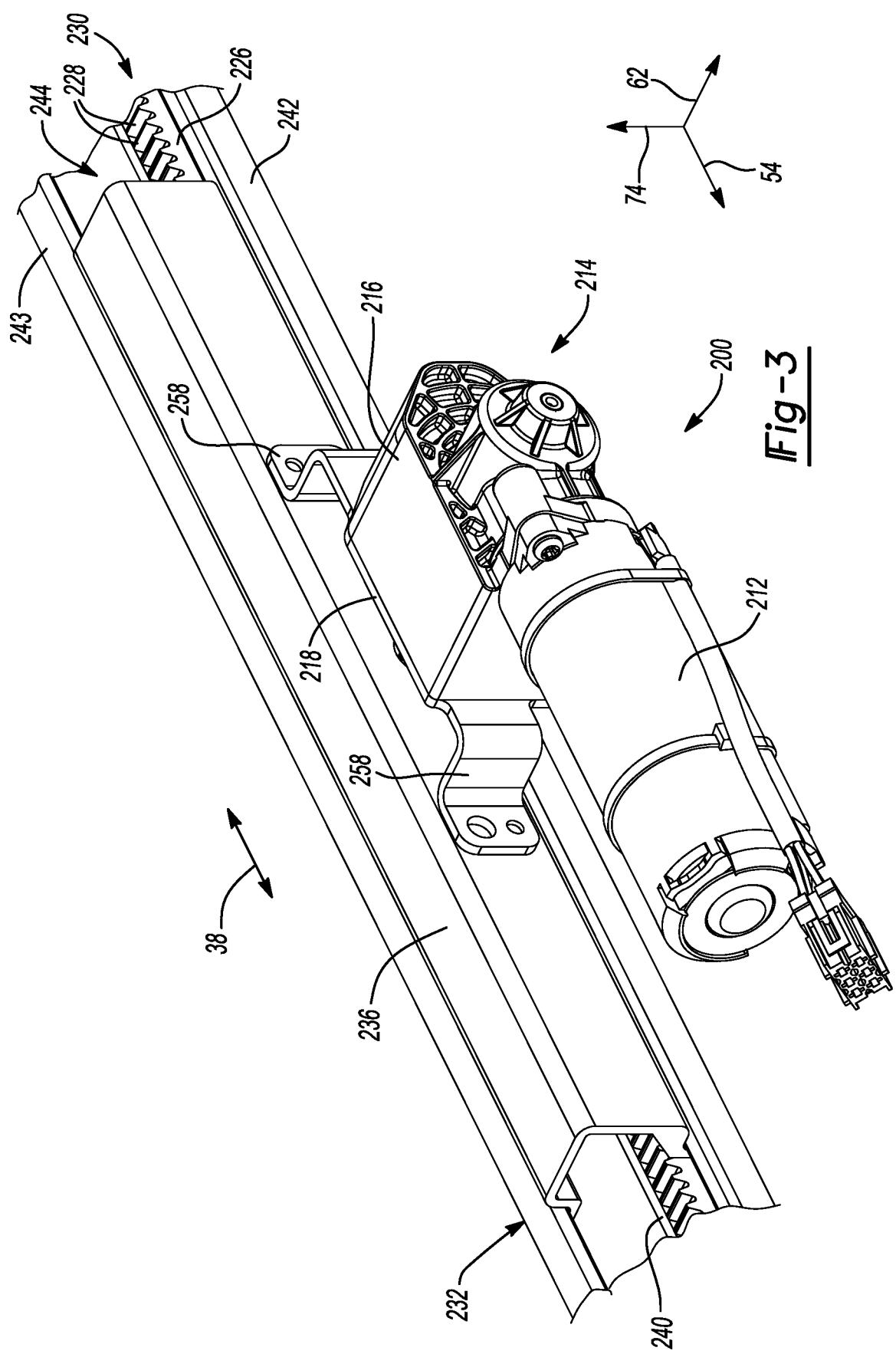
FIG. 3 is a side perspective view of another exemplary seat adjuster drive that has been constructed in accordance with the present disclosure where the stationary and sliding tracks of the seat adjuster drive have been shown.
Figure 4:
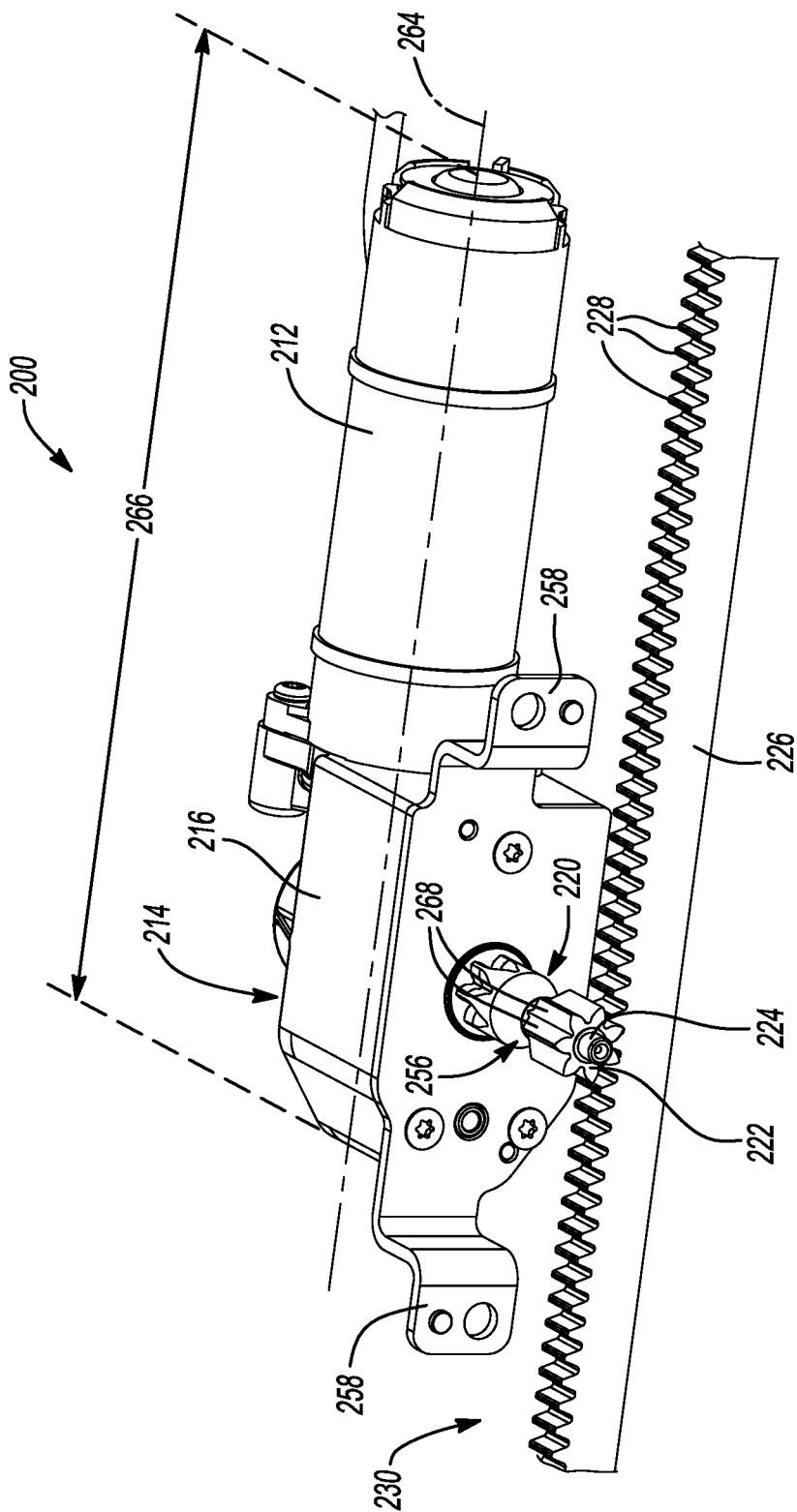
FIG. 4 is an opposite side perspective view of the seat adjuster drive shown in FIG. 3 where the stationary and sliding tracks of the seat adjuster drive have been hidden from view.

With reference to FIGS. 3 and 4, another exemplary seat adjuster drive 200 is shown. Again, the automotive seat adjuster drive 200 includes an electric motor 212 that is mounted to a gear box 214. The gear box 214 includes a gear box housing 216 and a gear box cover 218. A pinion 220 extends out of the gear box 214 through the gear box cover 218. The pinion 220 includes a gear toothed portion 222 and an optional pinion bearing 224. The gear toothed portion 222 of the pinion 220 is arranged in meshing engagement with a rack 226, which includes a plurality of rack teeth 228. Together, the pinion 220 and the rack 226 comprise a rack and pinion drive assembly 230. The seat adjuster drive 200 includes a stationary track 232 that is configured to be fixed to the sub-floor 34 of a vehicle, such as an automobile, and a sliding track 236 that is arranged in sliding engagement with the stationary track 232 for movement in fore and aft directions 38 that are arranged parallel to an x-axis 54 of the vehicle (i.e., longitudinal movement towards the front of the vehicle and towards the rear of the vehicle). The stationary track 232 includes a bottom wall 240 and first and second side walls 242, 243 that extend upwardly from the bottom wall 240 to define a track channel 244 that receives at least part of the sliding track 236. The pinion bearing 224 is received in a slot (not shown) in the second side wall 243 of the stationary track 232, which helps support the pinion 220 and resists pinion deflection.

In FIGS. 3 and 4, the rack 226 of the rack and pinion drive assembly 230 extends longitudinally along the bottom wall 240 of the stationary track 232 at a position that is inside the track channel 244. As a result, the pinion 220 in this embodiment is elongated to reach into the track channel 244. Optionally, a clearance groove 256 may be cut into the pinion 220 at a position that is aligned with the first side wall 242 to provide additional clearance between the pinion 220 and the first side wall 242 of the stationary track 232. The gear box cover 218 includes a pair of L-shaped flanges 258 that are mounted to the sliding track 236 by a pair of fasteners (not shown). Again, rotational power from the electric motor 212 is transferred through the gear box 214 to rotate the pinion 220, which operates to drive the electric motor 212, gear box 214, and sliding track 236 in the fore and aft directions 38 relative to the stationary track 232.

The rack and pinion drive assemblies 30, 232 allow the seat adjuster drives 100, 200 disclosed herein to be used in applications requiring long track lengths with seat travel lengths of up to 1200 millimeters in the fore and aft direction 38. Such applications may include, but are not limited to, use of the seat adjuster drives 100, 200 in vehicles such as vans, mini-vans, sport utility vehicles, and cross-over vehicles. For both of the embodiments shown in FIGS. 1-4, the seat adjuster drives 100, 200 are configured such that a vehicle seat (not shown) is mounted to the sliding track 36, 236. More specifically, two of the seat adjuster drives 100 of the first embodiment, two of the seat adjuster drives 200 of the second embodiment, or a seat adjuster drive 100 of the first embodiment in combination with the seat adjuster drive 200 of the second embodiment may be used for each vehicle seat. As a result, there will be right and left seat adjuster drives 100, 200 with right and left stationary tracks 32, 232, right and left sliding tracks 36, 236, right and left gear boxes 14, 214, and right and left electric motors 12, 212 for a single vehicle seat. Because of this arrangement, the transverse span (i.e., the distance along a y-axis 62 of the vehicle) between the right and left sliding tracks 36, 236 is limited.

Advantageously, the gear boxes 14, 214 disclosed herein allow the electric motors 12, 212 of the seat adjuster drives 100, 200 to be mounted longitudinally instead of in a transverse orientation relative to the tracks 32, 36, 232, 236. Each electric motor 12, 212 has a centerline axis 64, 264 and an overall length 66, 266. In the illustrated embodiments, the centerline axis 64, 264 of each electric motor 12, 212 is parallel to the x-axis 54 of the vehicle and is therefore parallel with the tracks 32, 36, 232, 236. In accordance with this arrangement, the overall length 66, 266 of each electric motor 12, 212 is therefore not as critical a packaging constraint as it would be if the electric motors 12, 212 were mounted in a transverse orientation (i.e., along the y-axis 62 of the vehicle). As a result, the seat adjuster drives 100, 200 of the present disclosure can be equipped with double commutator electric motors 12, 212 to provide a low speed (i.e., comfort) actuation mode of 11 to 26 millimeters per second and a high speed actuation mode of 45 to 60 millimeters per second. Double commutator electric motors 12, 212 typically have longer overall lengths 66, 266 making them difficult to package between the right and left tracks 32, 36, 232, 236 of the seat adjuster drives 100, 200. By orientating the centerline axis 64, 264 of the electric motors 12, 212 in the longitudinal direction (i.e., parallel with the x-axis 54) instead of in the transverse direction (i.e., parallel with the y-axis 62), the normal packaging constraints limiting the use of double commutator electric motors 12, 212 are eliminated. The gear toothed portion 22, 222 of the pinions 20, 220 may include integrally formed or rigidly connected pinion teeth 68, 268 that are configured to engage the rack teeth 28, 228. The number of pinion teeth 68, 268 can significantly affect the electric motor speed required to move the sliding tracks 36, 236 at a desired rate. For example, in embodiments of the present disclosure where 7 pinion teeth 68, 268 are provided, electric motor speeds of 3,300 to 4,200 rpm are required to move the sliding tracks 36, 236 at comfort speeds (15.6 to 20 millimeters per second) and electric motor speeds of 10,000 to 12,700 rpm are required to move the sliding tracks 36, 236 at high speeds (48 to 61 millimeters per second). In embodiments of the present disclosure where 8 pinion teeth 68, 268 are provided, electric motor speeds of 3,100 to 4,000 rpm are required to move the sliding tracks 36, 236 at comfort speeds (19.3 to 25 millimeters per second) and electric motor speeds of 7,500 to 9,900 rpm are required to move the sliding tracks 36, 236 at high speeds (58.6 to 75.4 millimeters per second).

Figure 5:
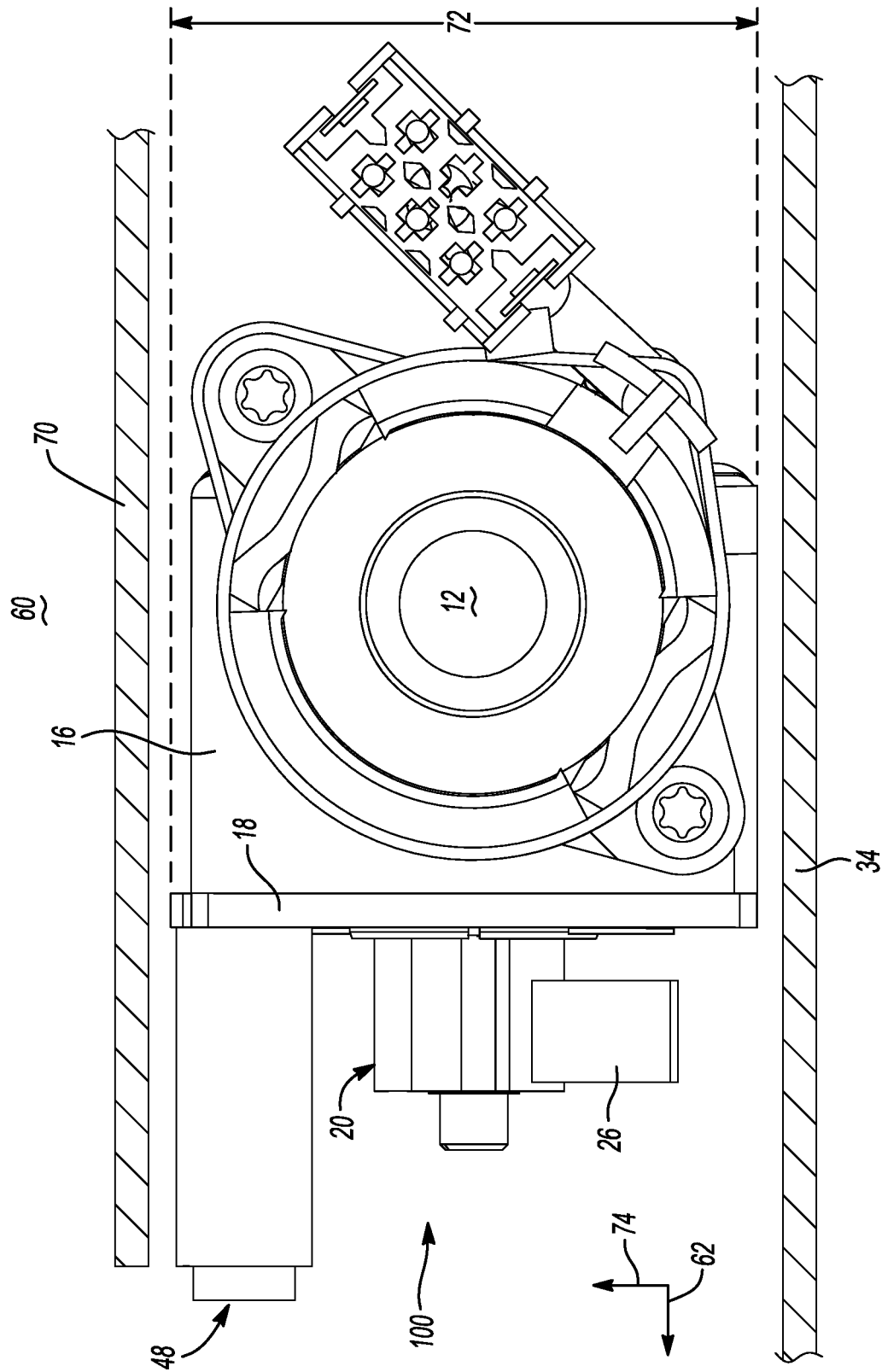
FIG. 5 is a rear elevation view of the seat adjuster drive shown in FIG. 1.
Figure 6:
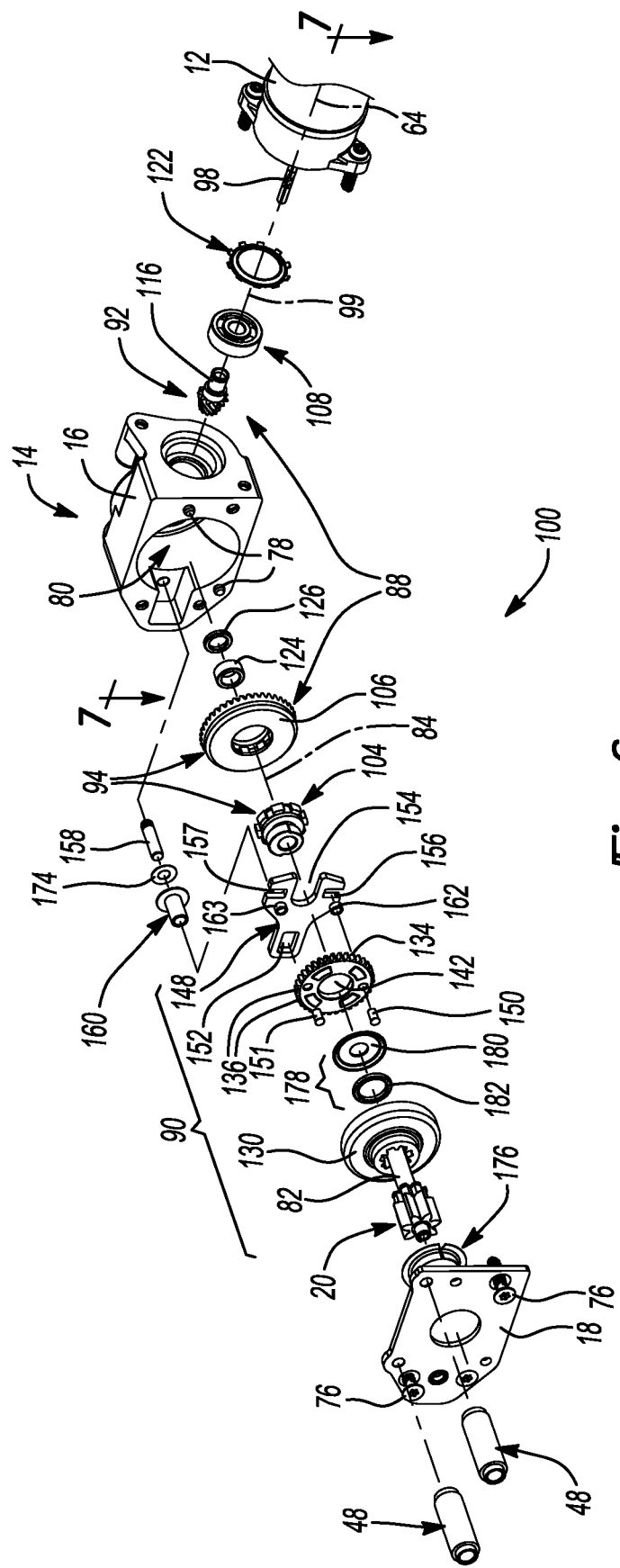
FIG. 6 is an exploded perspective view of the seat adjuster drive shown in FIG. 1.
Figure 7:
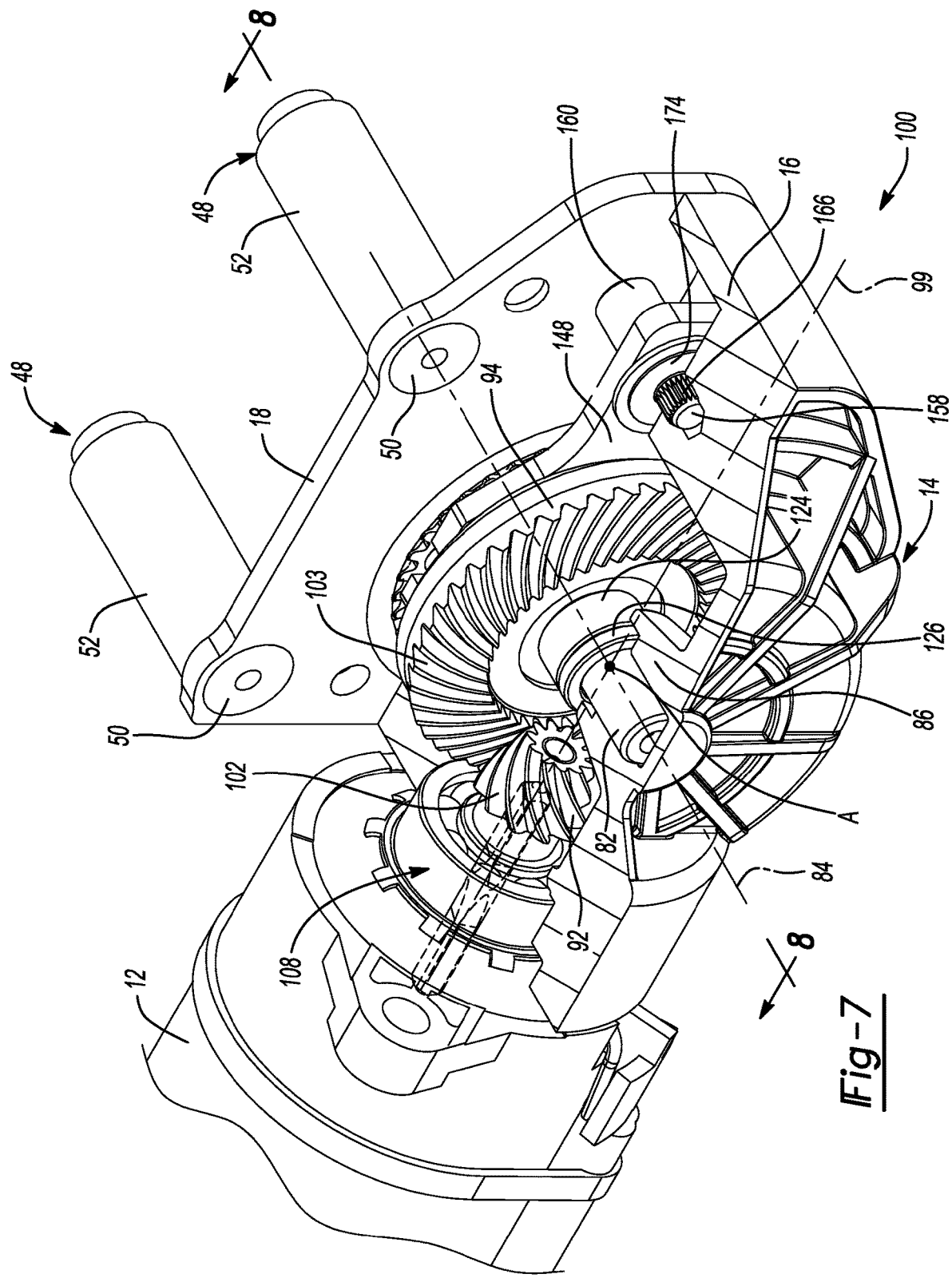
FIG. 7 is an enlarged section view of the seat adjuster drive shown in FIG. 1, taken along the line 7-7 in FIG. 6.
Figure 8:
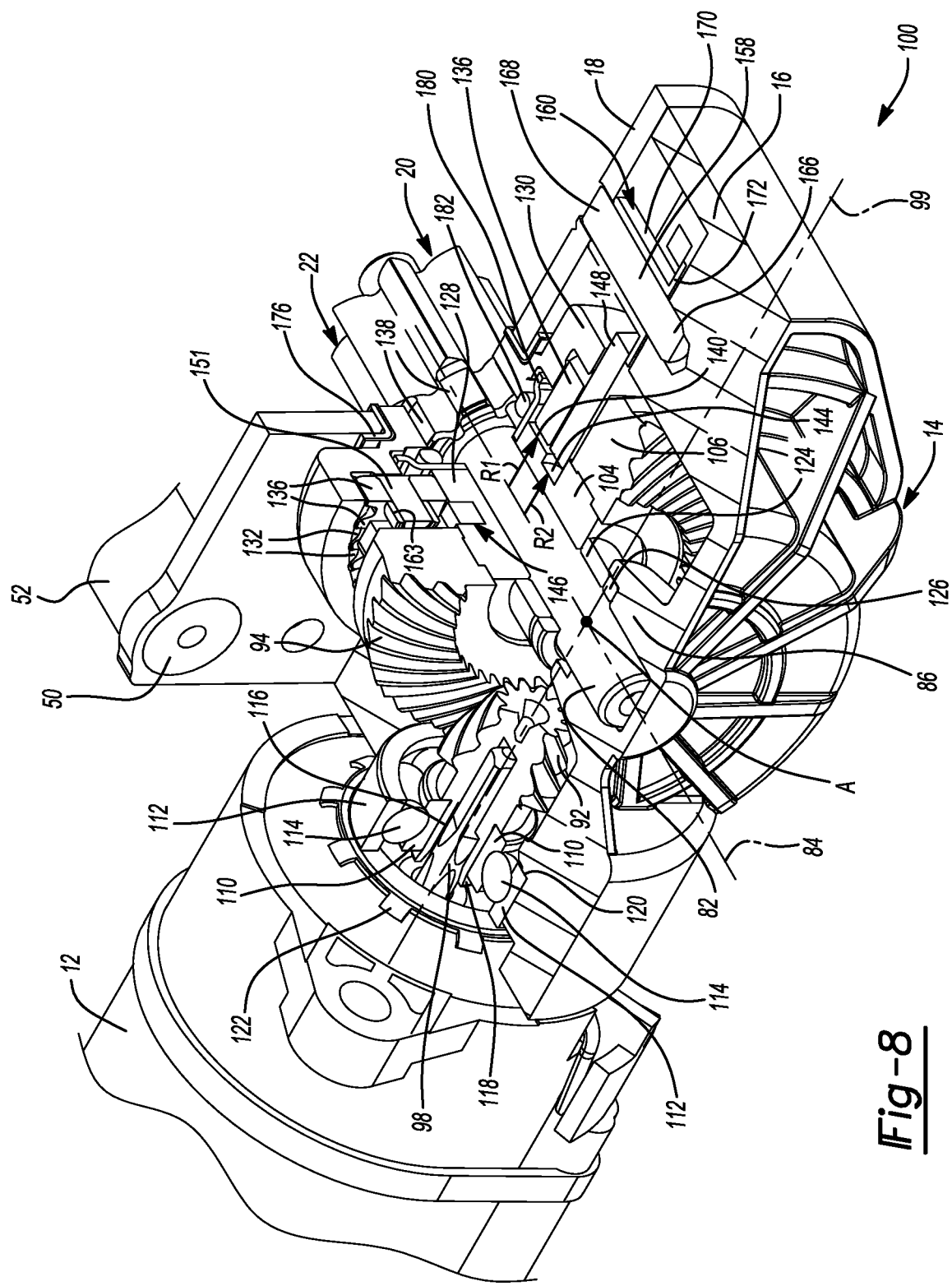
FIG. 8 is another enlarged section view of the seat adjuster shown in FIG. 1, taken along the line 8-8 in FIG. 7.
Figure 9:
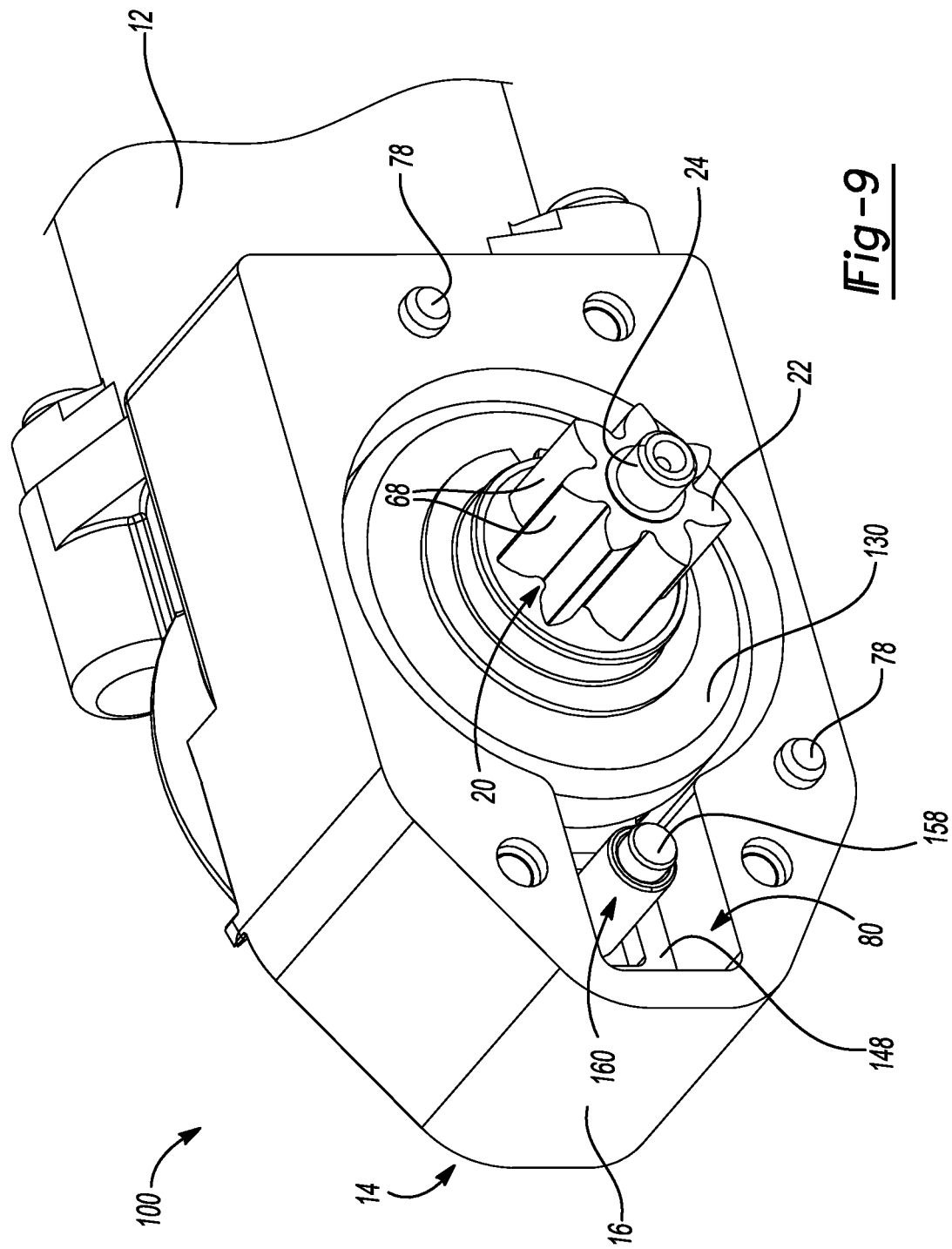
FIG. 9 is an enlarged side perspective view of the seat adjuster drive shown in FIG. 1 with the gear box cover removed.
Figure 10:
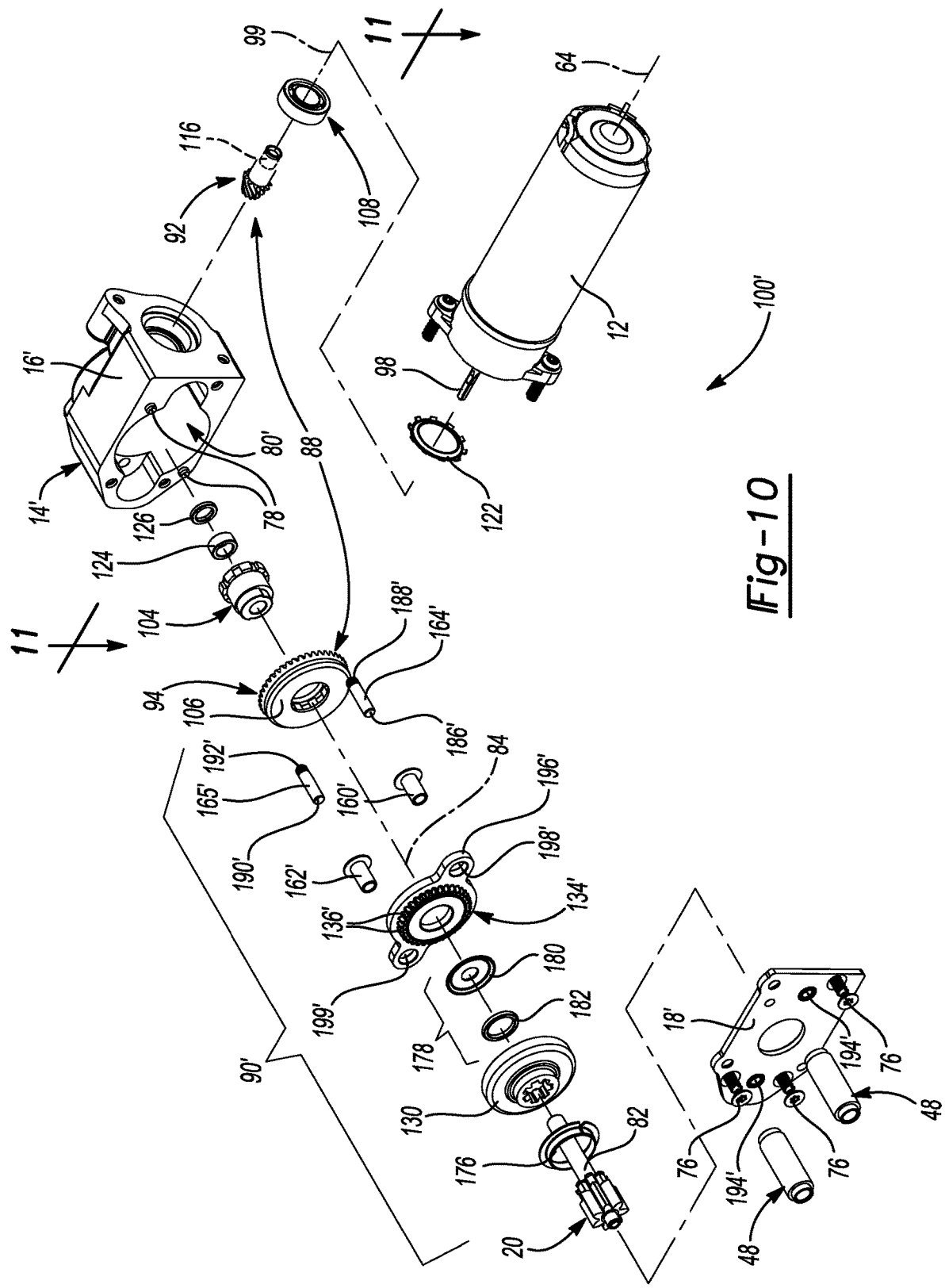
FIG. 10 is an exploded perspective view of another exemplary seat adjuster drive that has been constructed in accordance with the present disclosure.
Figure 11:
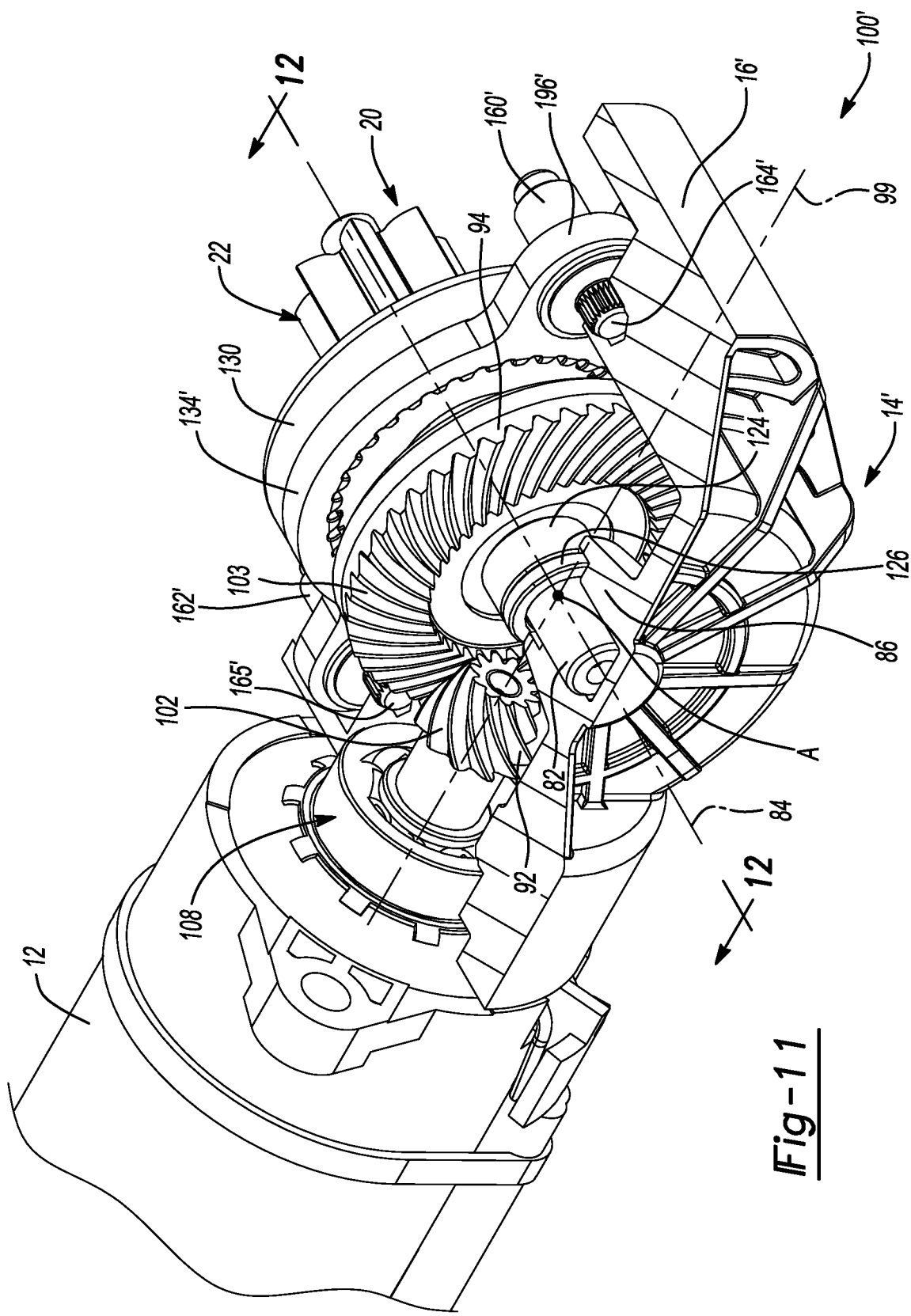
FIG. 11 is an enlarged section view of the seat adjuster drive shown in FIG. 10, taken along the line 11-11 in FIG. 10.
Figure 12:
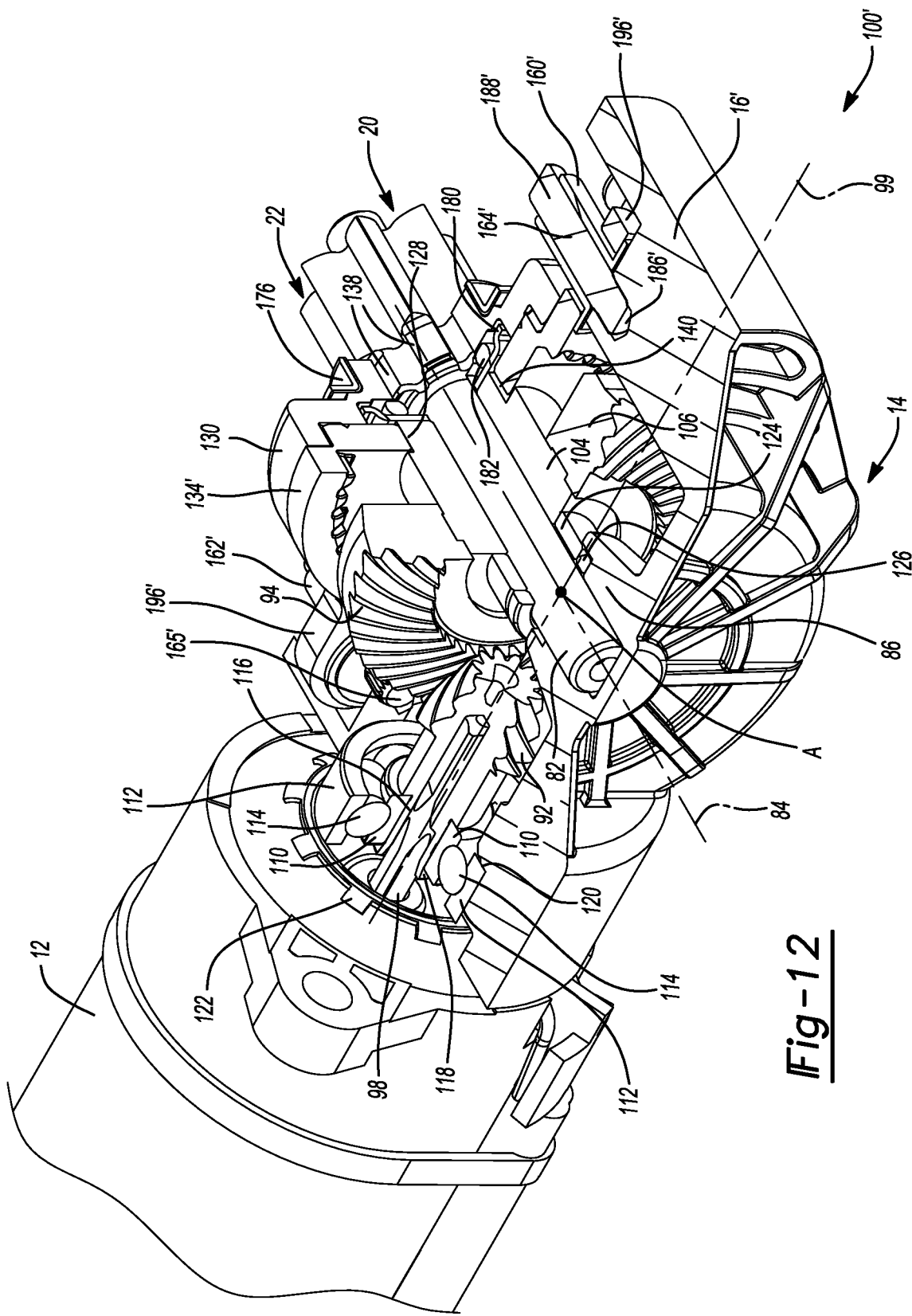
FIG. 12 is another enlarged section view of the seat adjuster shown in FIG. 10, taken along the line 12-12 in FIG. 11.
Figure 13:
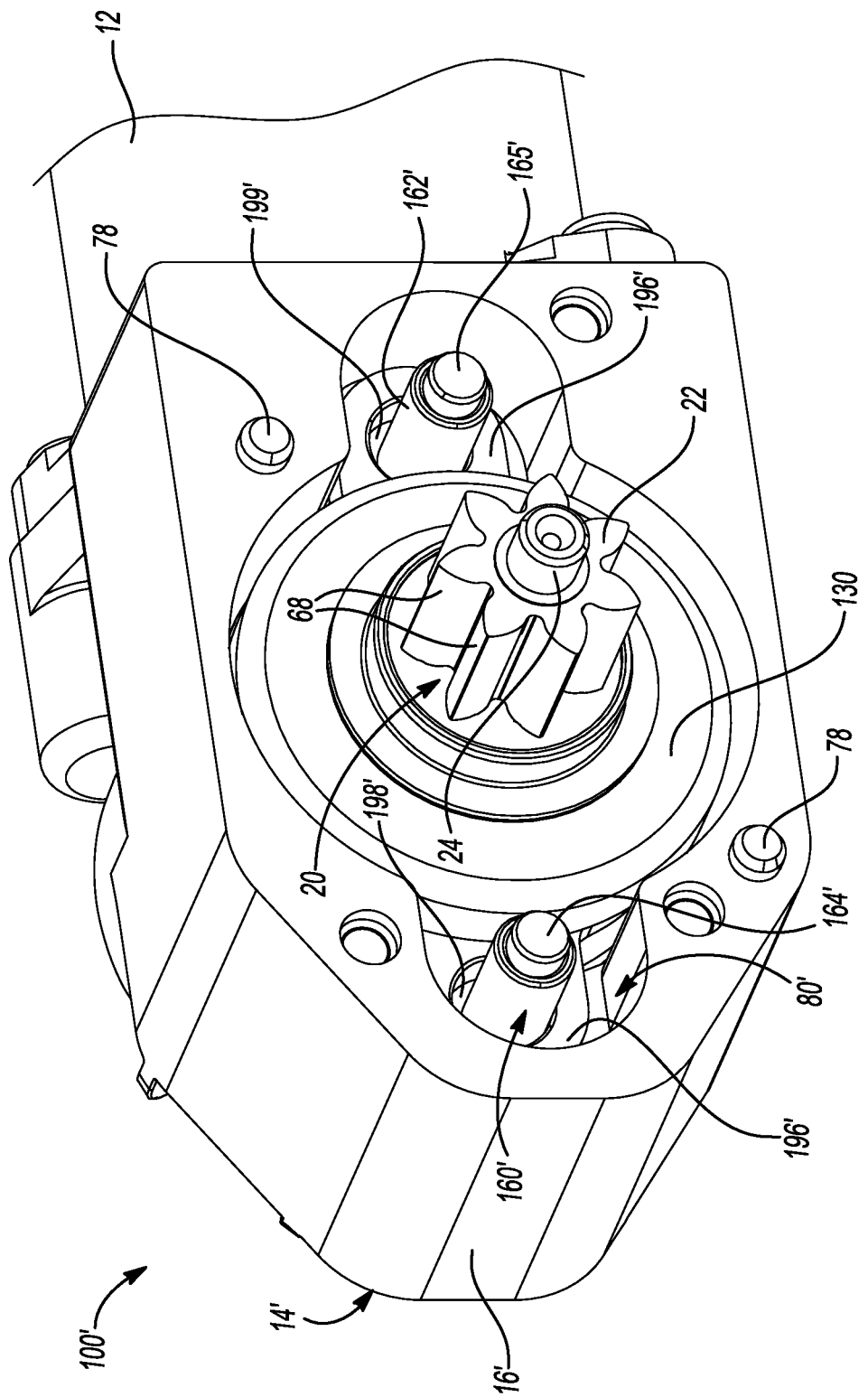
FIG. 13 is an enlarged side perspective view of the seat adjuster drive shown in FIG. 10 with the gear box cover removed.
Figure 14:
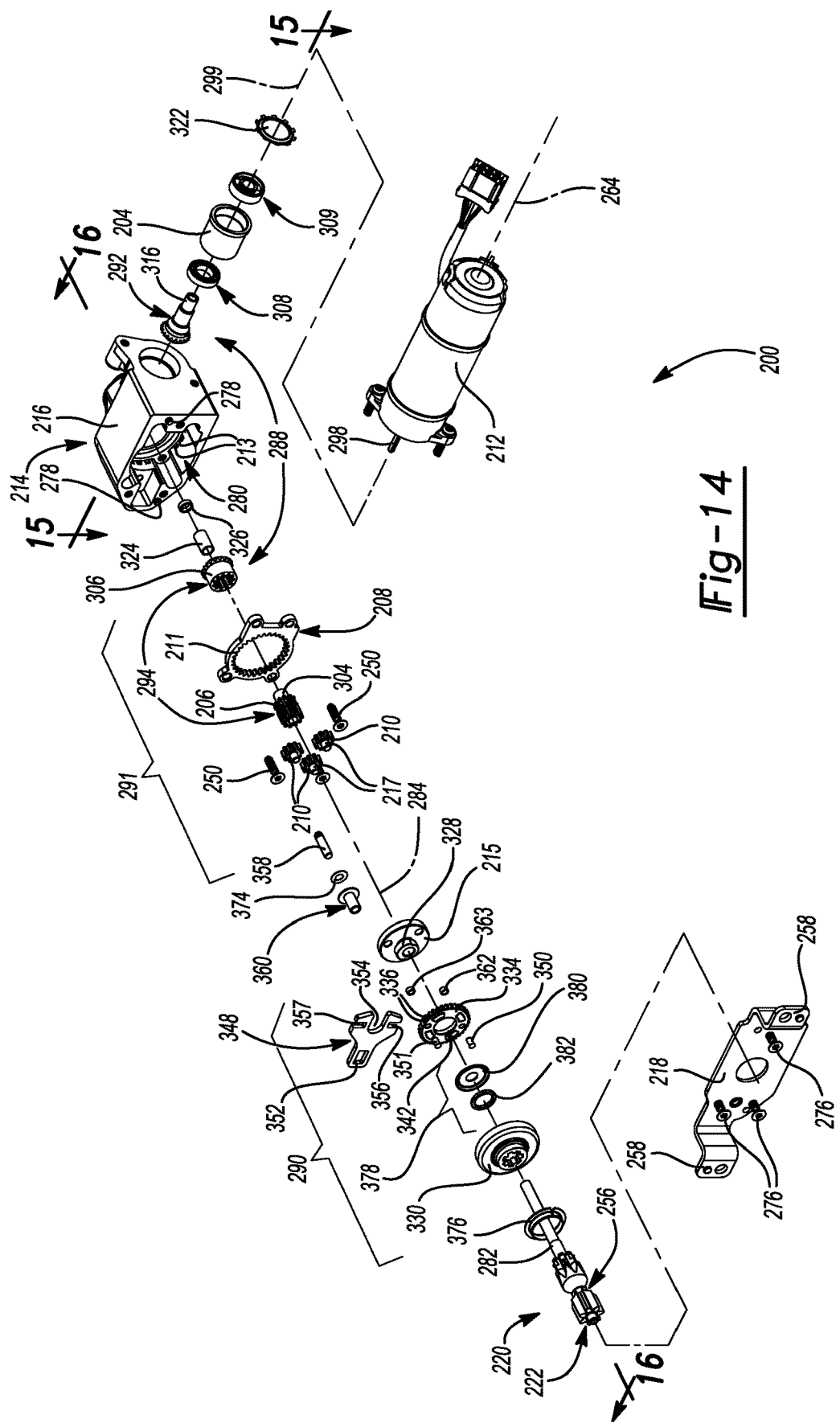
FIG. 14 is an exploded perspective view of another exemplary seat adjuster drive that has been constructed in accordance with the present disclosure.
Figure 15:
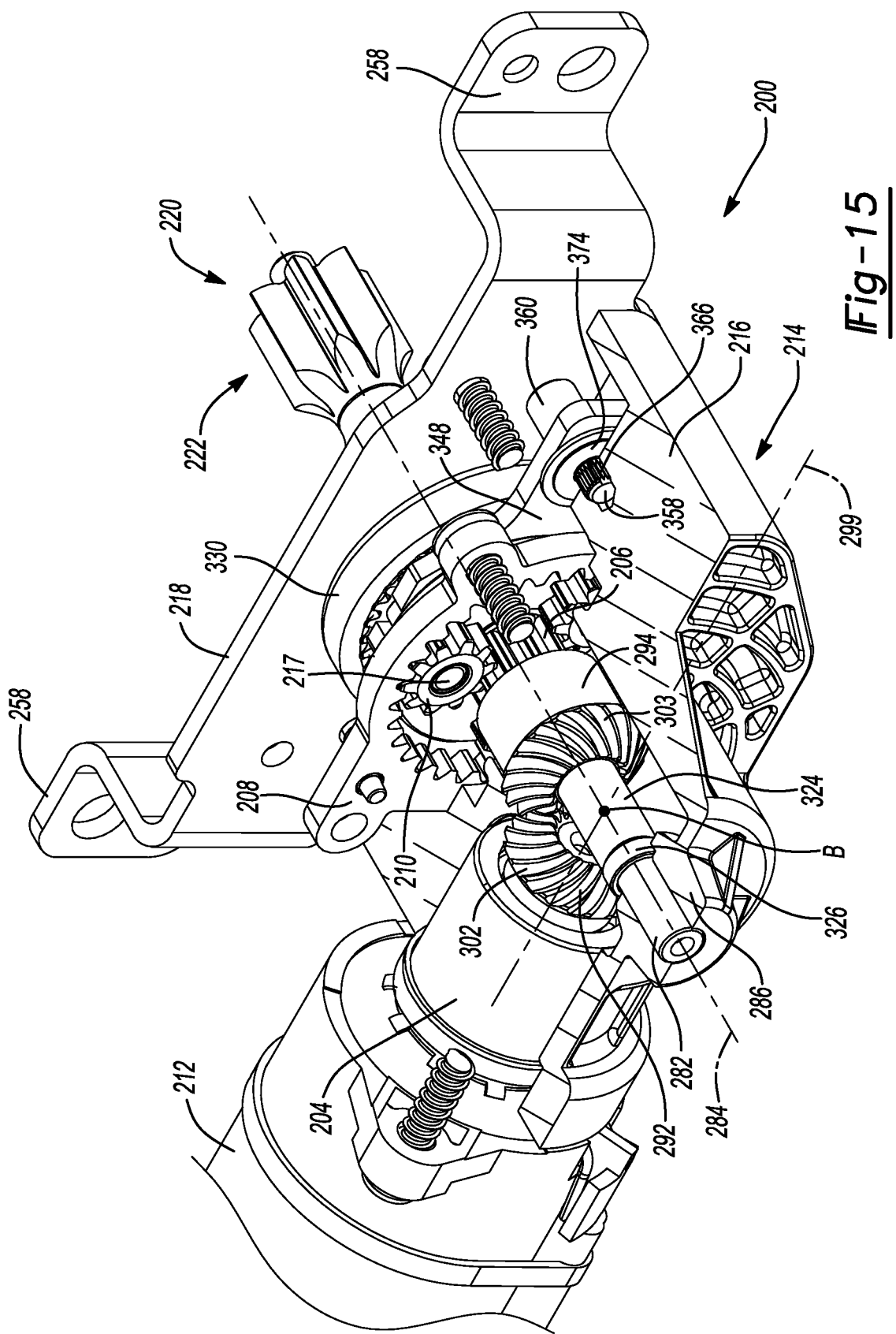
FIG. 15 is an enlarged section view of the seat adjuster drive shown in FIG. 14, taken along the line 15-15 in FIG. 14.
Figure 16:
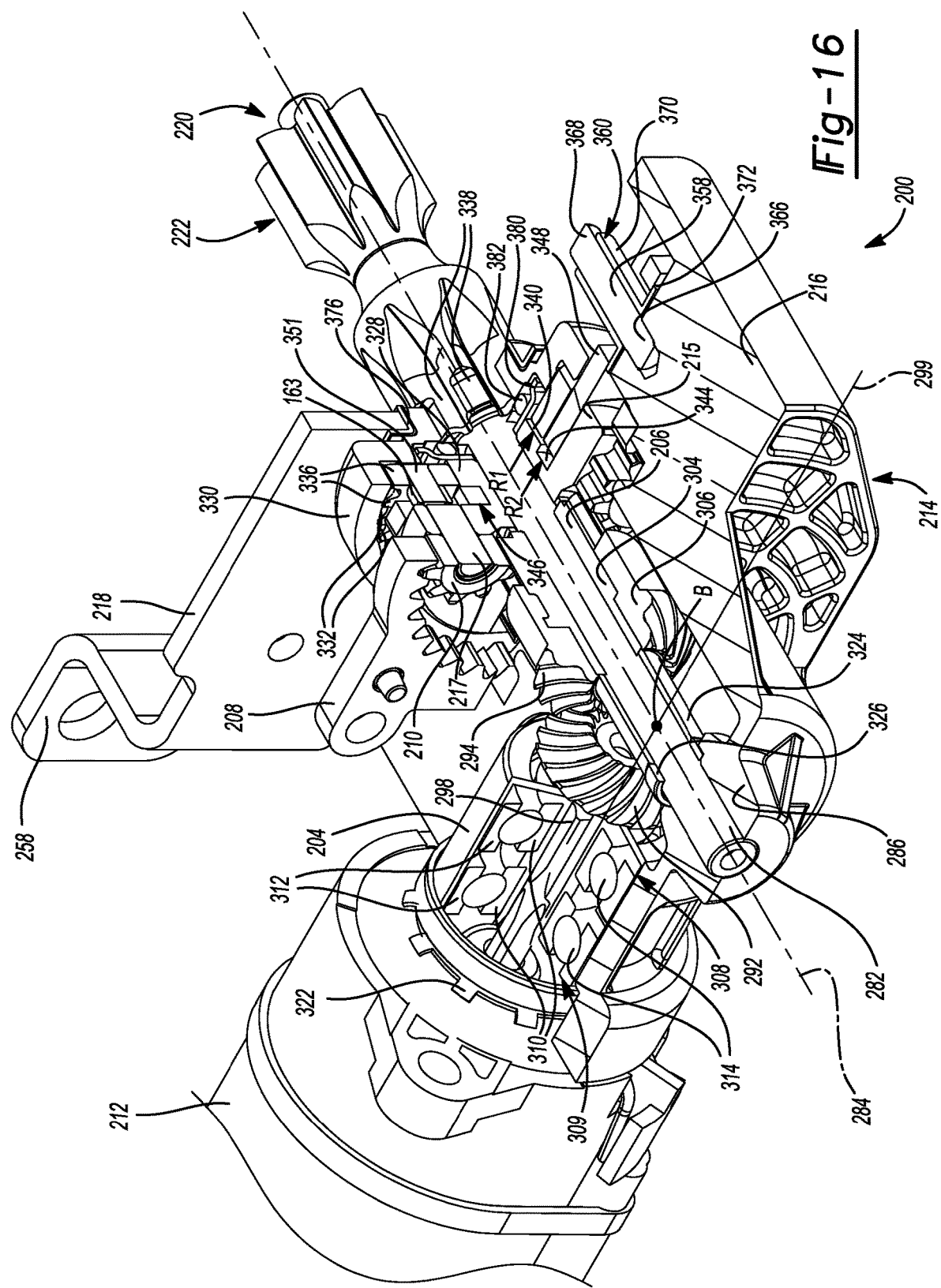
FIG. 16 is another enlarged section view of the seat adjuster shown in FIG. 14, taken along the line 16-16 in FIG. 14.
Figure 17:
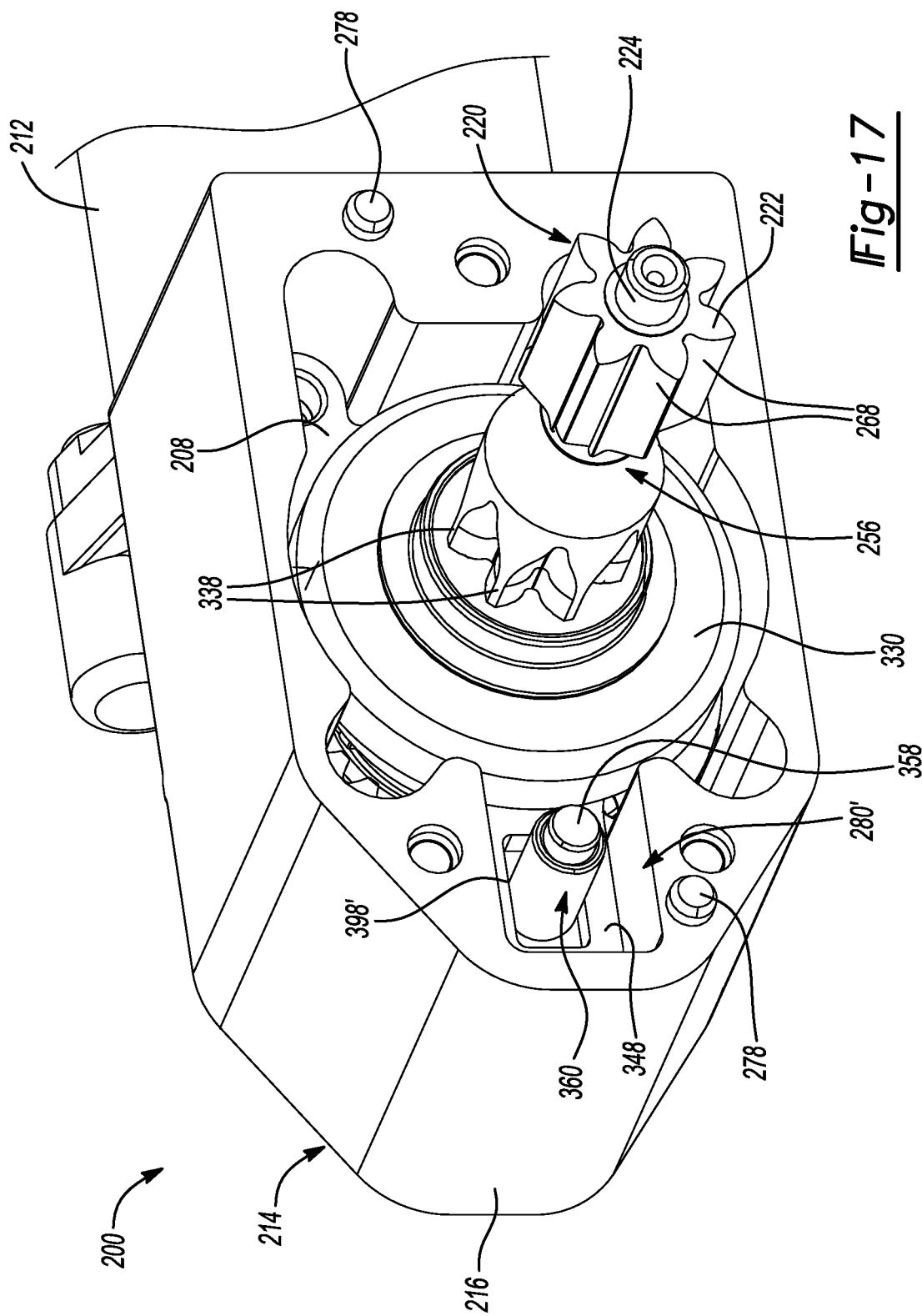
FIG. 17 is an enlarged side perspective view of the seat adjuster drive shown in FIG. 14 with the gear box cover removed.
Figure 18:
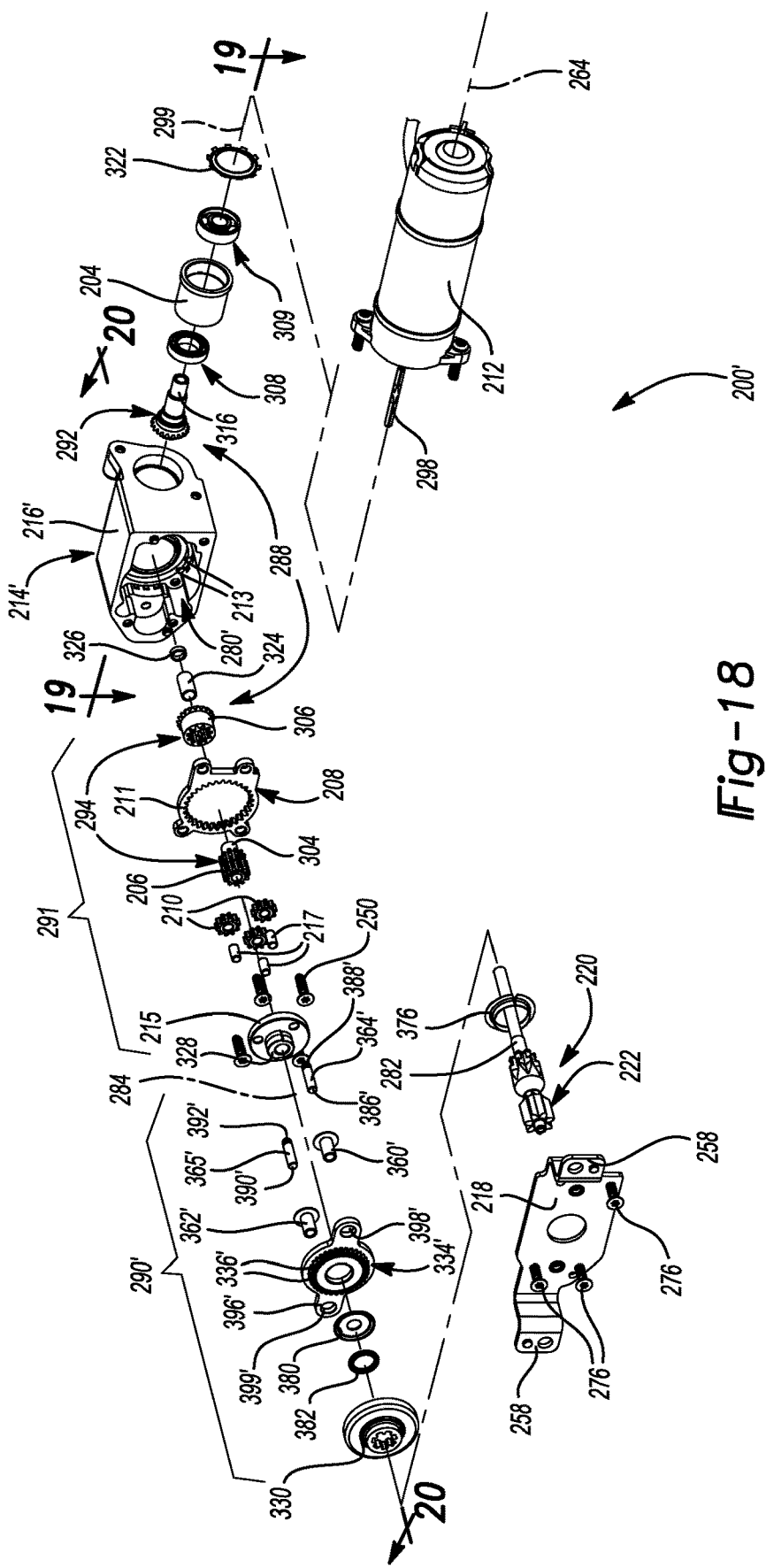
FIG. 18 is an exploded perspective view of another exemplary seat adjuster drive that has been constructed in accordance with the present disclosure.
Figure 19:
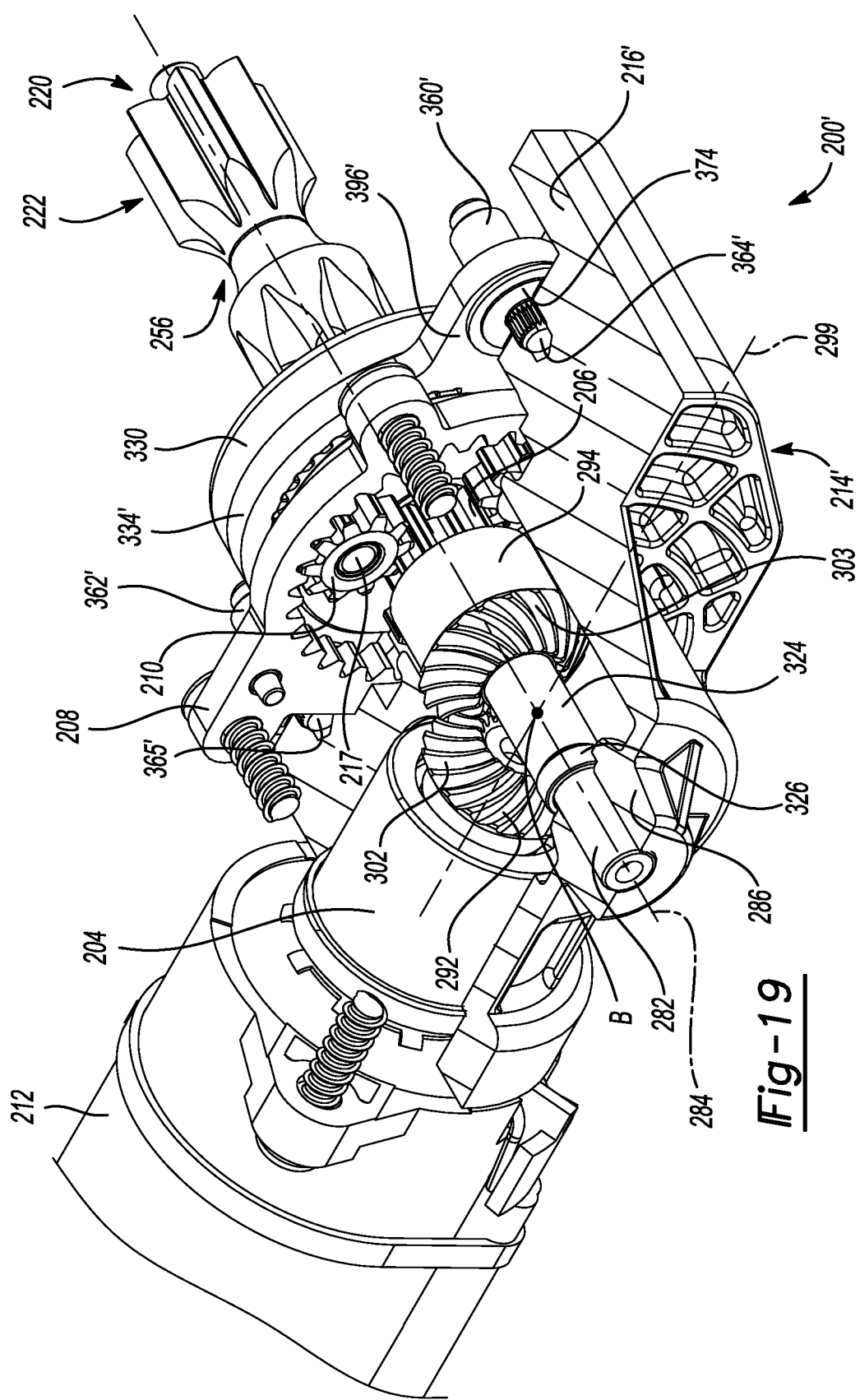
FIG. 19 is an enlarged section view of the seat adjuster drive shown in FIG. 18, taken along the line 19-19 in FIG. 18.
Figure 20:
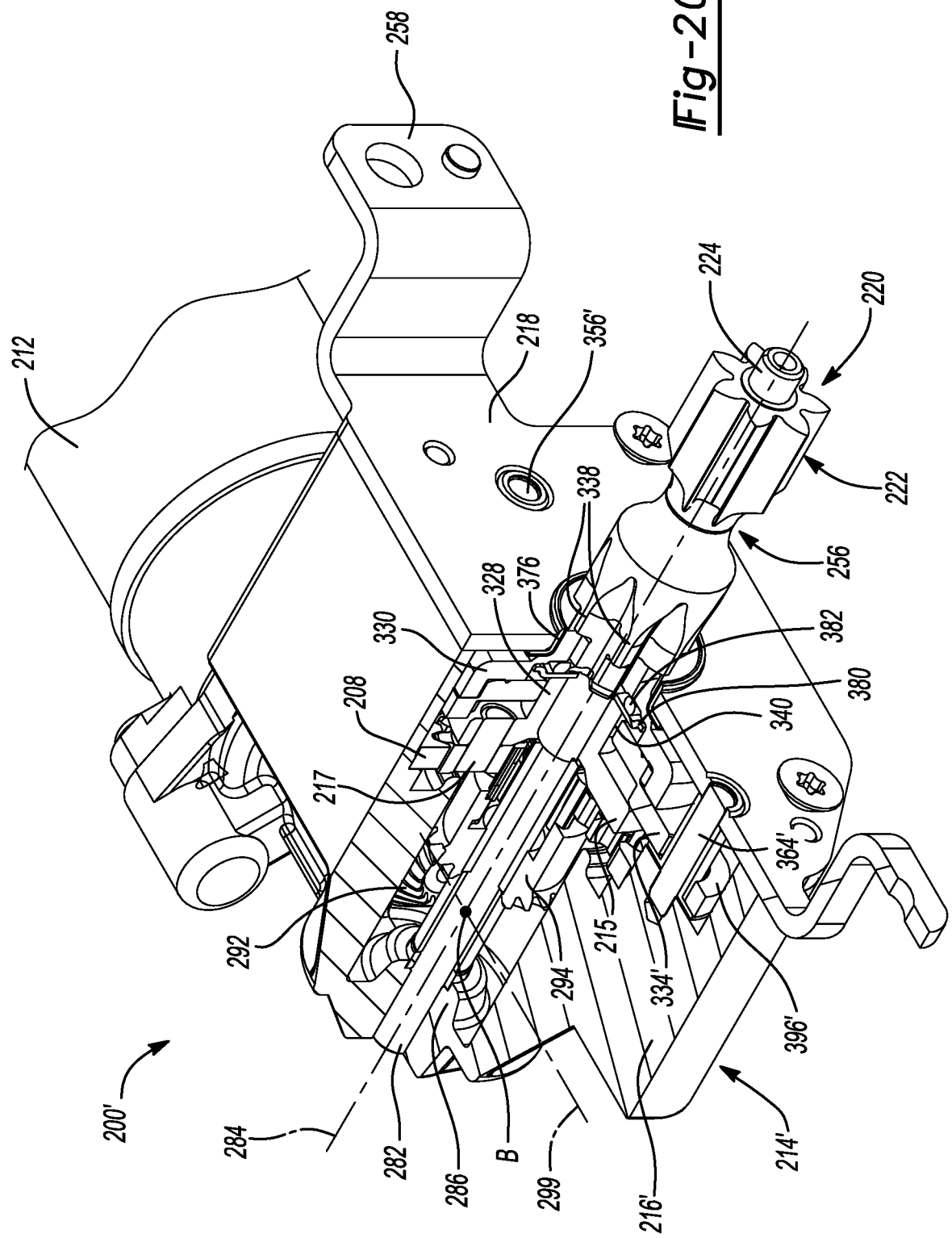
FIG. 20 is another enlarged section view of the seat adjuster shown in FIG. 18, taken along the line 20-20 in FIG. 18.
Figure 21:
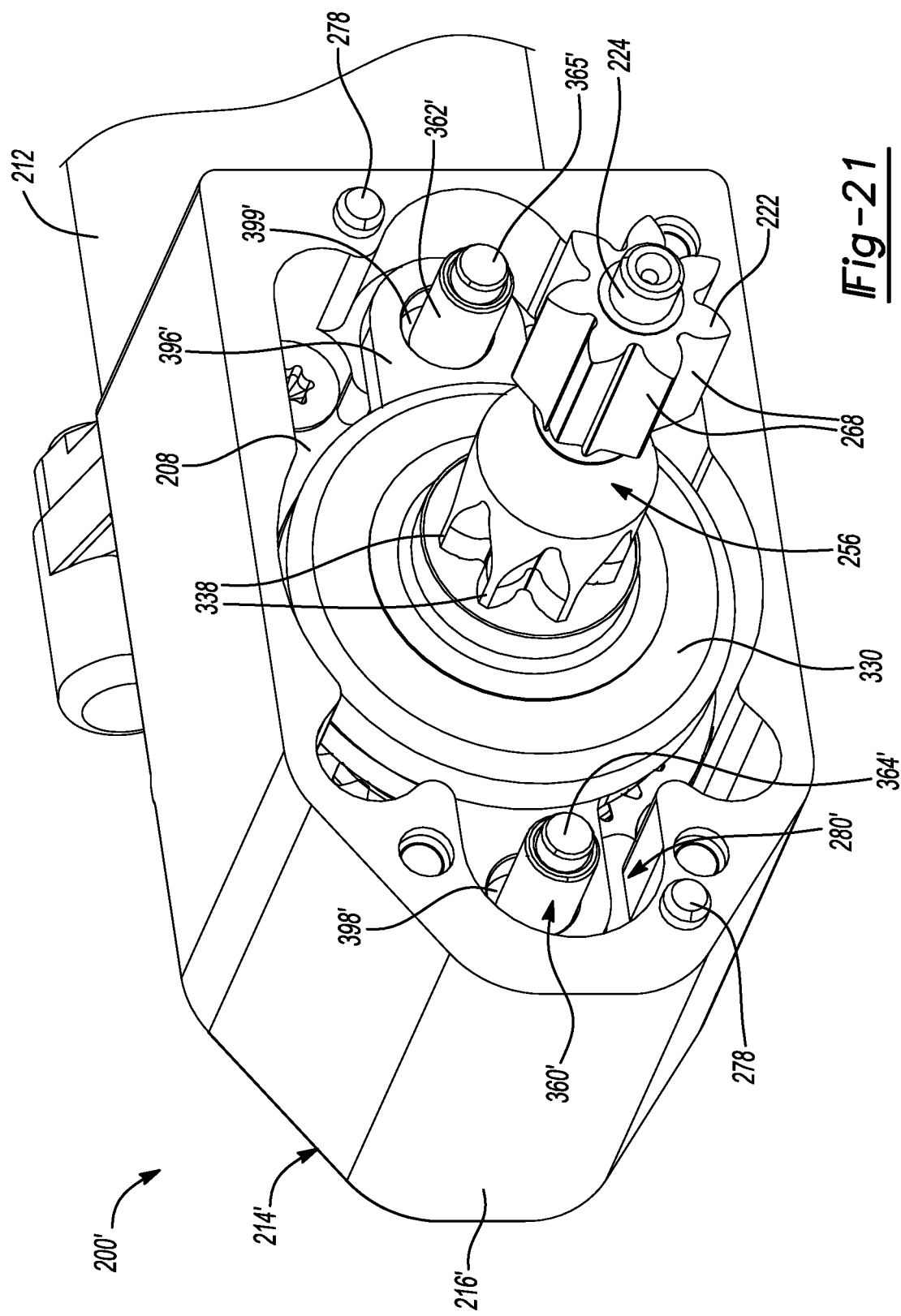
FIG. 21 is an enlarged side perspective view of the seat adjuster drive shown in FIG. 18 with the gear box cover removed.

Vehicles such as vans, mini-vans, sport utility vehicles, and cross-over vehicles typically have a passenger compartment 60 with a floor 70 that is relatively flat over large sections of the passenger compartment 60. With reference to FIG. 5, an end view of the seat adjuster drive 100 shown in FIGS. 1 and 2 is illustrated. It should be appreciated that the end view of the seat adjuster drive 200 shown in FIGS. 3 and 4 would look similar. For this view, it can be appreciated that an overall height 72 of the seat adjuster drive 100, which extends parallel to z-axis 74, is small. For example, the illustrated embodiments have an overall height 72 that is less than 50 millimeters. This reduced packaging height compared to other seat adjuster drives allows the seat adjuster drives 100, 200 herein to be installed beneath the floor 70 of the passenger compartment 60 of the vehicle. In accordance with such an arrangement, the stationary tracks 32, 232, the sliding tracks 36, 236, the gear boxes 14, 214, and the electric motors 12, 212 of the seat adjuster drives 100, 200 can be installed under the floor 70 in the space between the floor 70 of the passenger compartment 60 and the sub-floor 34 of the vehicle, which can provide improved safety and aesthetics.

FIGS. 6-9 are detailed views of the seat adjuster drive 100 shown in FIGS. 1 and 2. The electric motor 12 and the gear box cover 18 are mounted to the gear box housing 16 by screws 76. Locating pins 78 may also be provided on the gear box housing 16 to help position the gear box cover 18 in proper alignment with the gear box housing 16. Together, the gear box housing 16 and the gear box cover 18 define a gear box cavity 80 inside the gear box 14. The pinion 20 includes a pinion shaft 82 that extends through the gear box cover 18 and into the gear box cavity 80 along a pinion shaft axis 84. The pinion shaft 82 may be made from a metal such as steel. The pinion shaft 82 is received in a tubular support 86 formed in the gear box housing 16 opposite the gear box cover 18 in a sliding fit such that the pinion shaft 82 can rotate freely relative to the gear box housing 16. The gear box housing 16 and the gear box cover 18 may be made from a variety of different materials. By way of example and without limitation, the gear box housing 16 and the gear box cover 18 may be made from a rigid material such as plastic.

The gear box cavity 80 houses a conical spiral gear set 88 and a planetary gear set 90. The conical spiral gear set 88 includes a conical pinion gear 92 and a conical spiral gear 94, which create a first stage gear reduction. The electric motor 12 has a motor shaft 96 that is coupled to an output shaft 98. The output shaft 98 may be configured in a number of different arrangements, such as a flex shaft. The conical pinion gear 92 is coupled to the output shaft 98 such that the conical pinion gear 92 is driven by the electric motor 12 and rotates about a conical pinion gear axis 99. The conical pinion gear axis 99 is aligned with the centerline axis 64 of the electric motor 12. The conical spiral gear 94 is arranged in meshing engagement with the conical pinion gear 92 and is carried on the pinion shaft 82 in a sliding fit. As a result, the conical spiral gear 94 is free to rotate at a different rotational speed than the pinion shaft 82. The conical pinion gear 92 has a conical shape, spiral cut gear teeth 102, and is preferably made of metal. The conical spiral gear 94 preferably includes a hub portion 104 that is made of powdered metal and a toothed portion 106 that is made of over-molded plastic. The toothed portion 106 of the conical spiral gear 94 has spiral cut gear teeth 103 and is shaped to mesh with the conical pinion gear 92. This arrangement allows the conical pinion gear 92 to be driven at high speeds in excess of 10,000 rpm without producing excess noise.

The conical spiral gear set 88 is arranged within the gear box 14 such that the conical pinion gear axis 99 intersects the pinion shaft axis 84. For example, in the illustrated embodiment, the conical pinion gear axis 99 intersects the pinion shaft axis 84 at a perpendicular angle at point A. In accordance with this arrangement, the conical pinion gear axis 99 is spaced from and runs parallel to the stationary track 32 and the pinion shaft axis 84 is perpendicular to the stationary track 32. This configuration reduces the overall height 72 of the seat adjuster drive 100 because there is no offset spacing between the conical pinion gear axis 99 and the pinion shaft axis 84.

The conical pinion gear 92 is supported within the gear box housing 16 by a ball bearing assembly 108. The ball bearing assembly 108 includes an inner race 110, an outer race 112, and a plurality of ball bearings 114 positioned radially between the inner and outer races 110, 112. The inner race 110 of the ball bearing assembly 108 extends annularly about and contacts a barrel portion 116 of the conical pinion gear 92. The barrel portion 116 includes a terminal end 118, which is bent in an outward flare during assembly to hold the inner race 110 in place on the barrel portion 116 of the conical pinion gear 92. The outer race 112 of the ball bearing assembly 108 abuts a shoulder 120 formed in the gear box housing 16. The outer race 112 is held in contact with the shoulder 120 by a star ring 122, which is press fit into the gear box housing 16 during assembly. These features hold the conical pinion gear 92 and the ball bearing assembly 108 in place and prevent the conical pinion gear 92 from moving axially relative to the output shaft 98. The conical spiral gear 94 is held in place by a bushing shim 124 and a spacer ring 126 that extend annularly about the pinion shaft 82 and are positioned between the conical spiral gear 94 and the tubular support 86 of the gear box housing 16.

The planetary gear set 90 in the gear box 14 rotatably couples the conical spiral gear 94 and the pinion 20 through a second stage gear reduction. The planetary gear set 90 includes an eccentric lobe 128 that is formed on the hub portion 104 of the conical spiral gear 94, a first gear 130 with internal teeth 132 that is rotatably coupled to the pinion shaft 82, and a second gear 134 with external teeth 136 that is carried on and driven by the eccentric lobe 128. As will be explained in greater detail below, the internal teeth 132 of the first gear 130 are arranged in meshing engagement with the external teeth 136 of the second gear 134 such that rotation of the second gear 134 drives rotation of the first gear 130 and the pinion shaft 82. In accordance with this embodiment, the eccentric lobe 128 is fixed to and rotates with the conical spiral gear 94 of the conical spiral gear set 88. By way of example and without limitation, the eccentric lobe 128 may be made from powdered metal.

The first gear 130 of the planetary gear set 90 is rotatably coupled to the pinion shaft 82. Although the first gear 130 may be rotatably coupled to the pinion shaft 82 in a number of different ways, in the illustrated example, the first gear 130 is rotatably coupled to the pinion shaft 82 by splines 138. The eccentric lobe 128 has a first bearing surface 140 that is eccentric relative to the pinion shaft axis 84. The first bearing surface 140 has a first radius R1. The second gear 134 is rotatably supported on the first bearing surface 140 of the eccentric lobe 128. The second gear 134 has a central bore 142. The first bearing surface 140 of the eccentric lobe 128 extends through and contacts the central bore 142 of the second gear 134. There is a slip fit between the first bearing surface 140 of the eccentric lobe 128 and the central bore 142 of the second gear 134 such that the second gear 134 can freely rotate on the first bearing surface 140 of the eccentric lobe 128.

The first and second gears 130, 134 are meshingly engaged in a planetary arrangement where the second gear 134 travels in a planetary, wobbling motion within the first gear 130. Although different configurations are possible, the internal and external teeth 132, 136 of the first and second gears 130, 134 may have a cycloid profile. The first and second gears 130, 134 may be made of a variety of different materials. By way of example and without limitation, the first and second gears 130, 134 may be made of metal or powdered metal.

The hub portion 104 of the conical spiral gear 94 has a second bearing surface 144 that is cylindrical and co-axially arranged with the pinion shaft axis 84. The second bearing surface 144 has a second radius R2 that is smaller than the first radius R1 of the first bearing surface 140. Due to the size difference between R1 and R2 and the eccentric (i.e. off-set) arrangement of the first bearing surface 140, a hub slot 146 is formed in the hub portion 104 between the toothed portion 106 of the conical spiral gear 94 and the eccentric lobe 128 on which a locking plate 148 is sliding supported and guided. The second bearing surface 144 and thus the hub slot 146 are not aligned with (i.e. are longitudinally offset relative to) the internal and external teeth 132, 136 of the first and second gears 130, 134. Accordingly, the locking plate 148 is longitudinally offset relative to the internal and external teeth 132, 136 of the first and second gears 130, 134 and does not contact or otherwise engage the internal or external teeth 132, 136 of the first and second gears 130, 134. Optionally, the first bearing surface 140 of the eccentric lobe 128 may have an inset region (not shown) in the form of an arc-shaped cut-out to reduce the surface area of the first bearing surface 140 and minimize friction.

The second gear 134 has first and second pins 150, 151 that extend longitudinally (i.e. parallel to the pinion shaft axis 84) from the second gear 134. The first and second pins 150, 151 are cylindrical in shape and are rigidly connected to one of the side faces of the second gear 134. The locking plate 148 has a fork-like shape and can be made from a variety of different materials. By way of example and without limitation, the locking plate 148 may be made of stamped steel. The locking plate 148 is transverse to the pinion shaft axis 84. The locking plate 148 has four slot cutouts 152, 154, 156, 157. The first slot cutout 152 is rectangular in shape and is closed on all four sides. The second, third, and fourth slot cutouts 154, 156, 157 have U-like shapes and are open on one side. A support pin 158 is rigidly fixed to the gear box housing 16. The support pin 158 is spaced from and extends parallel to the pinion shaft axis 84. The locking plate 148 is supported on and guided by the first and second pins 150, 151 on the second gear 134, the support pin 158, and the second bearing surface 144 of the hub portion 104. The support pin 158 is received in and extends through the first slot cutout 152 in the locking plate 148. The second slot cutout 154 in the locking plate 148 bears against the second bearing surface 144 of the hub portion 104. Because the second bearing surface 144 of the hub portion 104 is co-axially aligned with the pinion shaft axis 84, the interfaces between the support pin 158 and the first slot cutout 152 and the second bearing surface 144 of the hub portion 104 and the second slot cutout 154 restrict the locking plate 148 to a limited range of movement. The first and second pins 150, 151 on the second gear 134 are received in and extend through the third and fourth slot cutouts 156, 157 in the locking plate 148, respectively. The interfaces between the first and second pins 150, 151 on the second gear 134 and the third and fourth slot cutouts 156, 157 in the locking plate 148 restrict the movement of the second gear 134 to a planetary, wobbling motion and prevent the second gear 134 from rotating 360 degrees. The interaction between the locking plate 148 and the first and second pins 150, 151 on the second gear 134, the support pin 158, and the second bearing surface 144 of the hub portion 104 also prevent the pinion shaft 82 from rotating in either direction (i.e. clockwise or counter-clockwise) when the conical spiral gear 94 is not being driven by the conical pinion gear 92 and therefore provides anti-back drive capability.

Optionally, a first roller sleeve 160 may be fitted over the support pin 158. Similarly, second and third roller sleeves 162, 163 may optionally be fitted over the first and second pins 150, 151 on the second gear 134. The first, second, and third roller sleeves 160, 162, 163 may be sized to provide a slip fit between the support pin 158 and the first roller sleeve 160 and between the first and second pins 150, 151 on the second gear 134 and the second and third roller sleeves 162, 163 such that the first, second, and third roller sleeves 160, 162, 163 may be free to rotate on the support pin 158 and the first and second pins 150, 151 on the second gear 134. The first support pin 164 may optionally include knurled end 166 that is pressed into the gear box housing 16 such that the first support pin 164 is fixed and does not rotate relative to the gear box housing 16. An opposite end 168 of the first support pin 164 extends through the gear box cover 18. The first roller sleeve 160 may include a barrel 170 and a flange portion 172 and a thin metal shim 174 may be arranged between the flange portion 172 of the first roller sleeve 160 and the gear box housing 16. This arrangement therefore reduces friction losses, wear, and noise during operation of the seat adjuster drive 100. Although the first, second, and third roller sleeves 160, 162, 163 may be made of a variety of different materials, in one non-limiting example, the first, second, and third roller sleeves 160, 162, 163 are made from a self-lubricated plastic material or from a plastic material resistant to high temperature such as PEEK. As an alternative, the first, third, and fourth slot cutouts 152, 154, 156, 157 in the locking plate 148 may be covered by self-lubricated plastic sleeves (not shown) while the support pin 158 and the first and second pins 150, 151 on the second gear 134 slide along the self-lubricated plastic sleeves with or without the use of the first, second, and third roller sleeves 160, 162, 163.

Regardless of whether the first, second, and third roller sleeves 160, 162, 163 or some other alternative are utilized, it should be appreciated that the geometry of the support pin 158 and the first and second pins 150, 151 on the second gear 134 significantly reduces friction losses. The cylindrical shape of the support pin 158 and the first and second pins 150, 151 on the second gear 134 minimizes the contact area between the support pin 158 and the first slot cutout 152 and between the first and second pins 150, 151 on the second gear 134 and the third and fourth slot cutouts 156, 157 in the locking plate 148 to either line or point contacts. This improves the mechanical efficiency of the gear box 14.

The interfaces between the locking plate 148, the first and second pins 150, 151 on the second gear 134, the support pin 158, and the second bearing surface 144 of the eccentric lobe 128 synchronize the reciprocating motion of the locking plate 148 with the planetary, wobbling motion of the second gear 134. The planetary, wobbling motion of the second gear 134 follows a circular path where the external teeth 136 of the second gear 134 mesh with the internal teeth 132 of the first gear 130, forcing the first gear 130 and therefore the pinion shaft 82 to rotate with a uniform rotational speed about the pinion shaft axis 84 in the same direction of rotation as the direction of rotation of the eccentric lobe 128.

It should be appreciated that the planetary gear set 90 has only one, single-stage of gear reduction, which is the gear reduction between the first gear 130 and the second gear 134. The planetary gear set 90 has a gear ratio (a reduction ratio) that is dictated by the difference between the number of internal teeth 132 on the first gear 130 and the number of external teeth 136 on the second gear 134. The gear ratio of the planetary gear set 90 is defined by Equation 1 below:

$$\text{Gear Ratio} = +\frac{N_2}{N_2 - N_1} \quad \text{(Equation 1)}$$

In accordance with Equation 1, $N_1$ is the number of external teeth 136 on the second gear 134 and $N_2$ is the number of internal teeth 132 on the first gear 130. The gear ratio of the planetary gear set 90 is a positive number, indicating that the direction of rotation at the pinion 20 is the same as the direction of rotation that the eccentric lobe 128 is being driven in by the electric motor 12.

In order to maintain the position of the conical spiral gear 94 on the pinion shaft 82 in a position where the first bearing surface 140 of the eccentric lobe 128 is longitudinally aligned with the second gear 134, a spring plate assembly 178 is provided on the pinion shaft 82 longitudinally between the eccentric lobe 128 and the first gear 130. The spring plate assembly 178 includes a washer cup 180 and an O-ring 182. The O-ring 182 is made of a resilient material, such as rubber, which can expand and compress to dampen small longitudinal movements of the conical spiral gear 94 on the pinion shaft 82. A bearing sleeve 176 is positioned on the opposite side of the first gear 130 and radially between a portion of the first gear 130 and the gear box cover 18. The bearing sleeve 176 is made from a low-friction material such as a self-lubricated plastic material and therefore permits the first gear 130 to rotate within the gear box cavity 80 with minimal wear to the gear box cover 18.

Any attempt of the first gear 130 to back-drive the second gear 134 due to an external torque load acting on the pinion 20, resulting for example from a collision, is prevented through a reaction moment created by contact forces acting between the first slot cutout 152 of the locking plate 148 and the support pin 158, the second slot cutout 154 and the second bearing surface 144 of the hub portion 104, and the third and fourth slot cutouts 156, 157 of the locking plate 148 and the first and second pins 150, 151 of the second gear 134. Because the support pin 158 and the second bearing surface 144 of the hub portion 104 limit the movement of the locking plate 148, the first gear 130 cannot back drive the second gear 134, and accordingly the eccentric lobe 128, in a counter-clockwise direction. This protects the electric motor 12 from damage and prevents external forces from changing the longitudinal (i.e., fore-aft) position of the vehicle seat, such as during a crash event. Greater detail regarding the anti-back drive capability of the locking plate 148 is described in U.S. Pat. No. 9,902,295, which is expressly incorporated herein by reference.

FIGS. 10-13 illustrate another seat adjuster drive 100' that shares many of the same components as the seat adjuster drive 100 shown in FIGS. 6-9. Components shared between these two embodiments have like reference numbers, while the components that are different in the seat adjuster drive 100' shown in FIGS. 10-13 are designated with an apostrophe (') after the reference number. The description set forth above applies equally to all components shared between the seat adjuster drive 100 shown in FIGS. 6-9 and the seat adjuster drive 100' shown in FIGS. 10-13; however, in the later, the locking plate 148 has been eliminated. In its place, the seat adjuster drive 100' includes first and second support pins 164', 165' that are fixed relative to gear box housing 16' of gear box 14'. The first and second support pins 164', 165' are spaced from and extend parallel to the pinion shaft axis 84. The first support pin 164' extends between a first support pin end 186' and a second support pin end 188'. The second support pin 165' extends between a third support pin end 190' and a fourth support pin end 192'. The first and second support pins 164', 165' are rigidly fixed within the gear box housing 16' at the first and third support pin ends 186', 190' and are rigidly fixed within holes 194' in the gear box cover 18' at the second and fourth support pin ends 188', 192'.

Second gear 134' includes an external flange 196' that is provided with first and second guide holes 198', 199'. The external flange 196' extends outwardly from the external teeth 136' of the second gear 134' in a plane that is transverse to the pinion shaft axis 84. The external flange 196' may be integrally formed as part of the second gear 134' or may be a separately formed component that is rotatably fixed to the part of the second gear 134' that includes the external teeth 136'. The first and second guide holes 198', 199' extend through the external flange 196' of the second gear 134'. The first and second support pins 164', 165' are received in and extend through the first and second guide holes 198', 199' in the external flange 196' of the second gear 134', respectively. The first and second guide holes 198', 199' have first and second guide hole radii and the first and second support pins 164', 165' have first and second support pin radii that are smaller than the first and second guide hole radii. In accordance with one example, the first guide hole radius may equal the sum of the first support pin radius and the eccentricity of the eccentric lobe 128 and the second guide hole radius may equal the sum of the second support pin radius and the eccentricity eccentric lobe 128. The size relationship between the first and second guide hole radii and the first and second support pin radii permits the second gear 134' to move freely in a planetary, wobbling movement relative to the pinion shaft axis 84 when the eccentric lobe 128 is rotatably driven. As will be explained in greater detail below, contact between the first bearing surface 140 of the eccentric lobe 128 and the second gear 134', the first support pin 164' and the first guide hole 198' in the external flange 196', and the second support pin 184' and the second guide hole 199' in the external flange 196' prevents the first gear 130 from back-driving rotation of the second gear 134'.

The first and second support pins 164', 165' and the first and second guide holes 198', 199' of the external flange 196' form two crank-rocker type parallelogram mechanisms about the pinion shaft axis 84. The interfaces between the first and second support pins 164', 165' on the second gear 134' and the first and second guide holes 198', 199' in the external flange 196' restrict the movement of the second gear 134' to a planetary, wobbling motion and prevent the second gear 134' from rotating 360 degrees. The interaction between the first and second support pins 164', 165' and the first and second guide holes 198', 199' in the external flange 196' of the second gear 134' and the interaction of the first bearing surface 140 of the eccentric lobe 128 and the second gear 134' prevents the pinion shaft 82 from rotating in either direction (i.e. clockwise or counter-clockwise) when the eccentric lobe 128 is not being driven by the electric motor 12 and therefore provides anti-back drive capability.

Optionally, first and second roller sleeves 160', 162' may be fitted over the first and second support pins 164', 165'. The first and second roller sleeves 160', 162' may be sized to provide a slip fit between the first and second support pins 164', 165' and the first and second roller sleeves 160', 162' such that the first and second roller sleeves 160', 162' are free to rotate on the first and second support pins 164', 165'. This arrangement therefore reduces friction losses, wear, and noise during operation of the seat adjuster drive 100'. Although the first and second roller sleeves 160', 162' may be made of a variety of different materials, in one non-limiting example, the first and second roller sleeves 160', 162' are made from a self-lubricated plastic material or from a plastic material resistant to high temperature such as PEEK. As an alternative, the first and second guide holes 198', 199' in the external flange 196' of the second gear 134' may be covered by self-lubricated plastic sleeves (not shown) while the first and second support pins 164', 165' slide along the self-lubricated plastic sleeves with or without the use of the first and second roller sleeves 160', 162'.

Regardless of whether the first and second roller sleeves 160', 162' or some other alternative are utilized, it should be appreciated that the geometry of the first and second support pins 164', 165' and the first and second guide holes 198', 199' in the external flange 196' of the second gear 134' significantly reduces friction losses. The cylindrical shape of the first and second support pins 164', 165' minimizes the contact area between the first and second support pins 164', 165' and the first and second guide holes 198', 199' to either line or point contacts. This results in improved mechanical efficiency.

The second gear 134' moves in a planetary, wobbling motion within gear box cavity 80' along a circular eccentric path where the second gear 134' does not rotate about its own centerline. During the planetary, wobbling motion of the second gear 134', the external teeth 136' of the second gear 134' mesh with the internal teeth 132 of the first gear 130, forcing the first gear 130 and the pinion shaft 82 to rotate with an uniform rotational speed about the pinion shaft axis 84 in the same direction of rotation as the direction of rotation of the eccentric lobe 128.

Any attempt of the first gear 130 to drive rotation of the second gear 134' due to an external torque load acting on the pinion 20, resulting for example from a collision, is prevented through a reaction moment created by contact forces acting between the second gear 134' and the first bearing surface 140 of the eccentric lobe 128 and contact forces acting between the first and second support pins 164', 165' and the first and second guide holes 198', 199' in the external flange 196' of the second gear 134'. The second gear 134' is held on its eccentric path relative to the pinion shaft axis 84 through the engagement of the external teeth 136' of the second gear 134' with the internal teeth 132 of the first gear 130. The contact forces prevent both backwards rotation of the pinion shaft 82, thereby protecting the electric motor 12 from damage and prevents external forces from changing the longitudinal (i.e., fore-aft) position of the vehicle seat, such as during a crash event. Greater detail regarding the anti-back drive capability of this arrangement is described in U.S. Pat. No. 10,024,392, which is expressly incorporated herein by reference.

FIGS. 14-17 are detailed views of the seat adjuster drive 200 shown in FIGS. 3 and 4. The gear box 214 of the seat adjuster drive 200 includes a gear box housing 216. By way of example and without limitation, the gear box housing 216 may be made from a rigid material such as plastic. The electric motor 212 and the gear box cover 218 are mounted to the gear box housing 216 by screws 276. Locating pins 278 may also be provided on the gear box housing 216 to help position the gear box cover 218 in proper alignment with the gear box housing 216. Together, the gear box housing 216 and the gear box cover 218 define a gear box cavity 280 inside the gear box 214. The pinion 220 includes a pinion shaft 282 that extends through the gear box cover 218 and into the gear box cavity 280 along a pinion shaft axis 284. The pinion shaft 282 may be made from a metal such as steel. The pinion shaft 282 is received in a tubular support 286 formed in the gear box housing 216 opposite the gear box cover 218 in a sliding fit such that the pinion shaft 282 can rotate freely relative to the gear box housing 216.

The gear box cavity 280 houses a conical spiral gear set 288, a first planetary gear set 290, and a second planetary gear set 291. The conical spiral gear set 288 includes a conical pinion gear 292 and a conical spiral gear 294, which provides a first stage gear reduction. The electric motor 212 has a motor shaft 296 that is coupled to an output shaft 298. The conical pinion gear 292 is coupled to the output shaft 298 such that the conical pinion gear 292 is driven by the electric motor 212 and rotates about a conical pinion gear axis 299. The conical pinion gear axis 299 is aligned with the centerline axis 264 of the electric motor 212. The conical spiral gear 294 is arranged in meshing engagement with the conical pinion gear 292 and is carried on the pinion shaft 282 in a sliding fit. As a result, the conical spiral gear 294 is free to rotate at a different rotational speed than the pinion shaft 282. The conical pinion gear 292 has a conical shape, spiral cut gear teeth 302, and is preferably made of metal. The conical spiral gear 294 preferably includes a hub portion 304 that is made of powered metal and a toothed portion 306 that is made of over-molded plastic. The toothed portion 306 of the conical spiral gear 294 has spiral cut gear teeth 303 and is shaped to mesh with the conical pinion gear 292. This arrangement allows the conical pinion gear 292 to be driven at high speeds in excess of 10,000 rpm without producing excess noise.

The conical spiral gear set 288 is arranged within the gear box 214 such that the conical pinion gear axis 299 intersects the pinion shaft axis 284. For example, in the illustrated embodiment, the conical pinion gear axis 299 intersects the pinion shaft axis 284 at a perpendicular angle at point B. In accordance with this arrangement, the conical pinion gear axis 299 is spaced from and runs parallel to the stationary track 232 and the pinion shaft axis 284 is perpendicular to the stationary track 232. This configuration reduces the overall height 72 of the seat adjuster drive 200 because there is no offset spacing between the conical pinion gear axis 299 and the pinion shaft axis 284.

The conical pinion gear 292 is supported within the gear box housing 216 by two ball bearing assemblies 308, 309 and a cassette 204. Each ball bearing assembly 308, 309 includes an inner race 310, an outer race 312, and a plurality of ball bearings 314 positioned radially between the inner and outer races 310, 312. The inner races 310 of the ball bearing assemblies 308, 309 extend annularly about and contact a barrel portion 316 of the conical pinion gear 292. The outer races 312 of the ball bearing assemblies 308, 309 contact the cassette 204, which holds the outer races 312 and therefore the ball bearing assemblies 308, 309 in a spaced apart relationship within the gear box housing 216. The cassette 204 is held in the gear box housing 216 by a star ring 322, which is press fit into the gear box housing 216 during assembly. These features hold the conical pinion gear 292 in place and prevent the conical pinion gear 292 from moving axially relative to the output shaft 298. The conical spiral gear 294 is held in place by a bushing shim 324 and a metal ring 326 that extend annularly about the pinion shaft 282 and are positioned between the conical spiral gear 294 and the tubular support 286 in the gear box housing 216.

The first and second planetary gear sets 290, 291 in the gear box 214 rotatably couple the conical spiral gear 294 and the pinion 220 through a second stage gear reduction and a third stage gear reduction. The first planetary gear set 290 includes an eccentric lobe 328, a first gear 330 with internal teeth 332 that is rotatably coupled to the pinion shaft 282, and a second gear 334 with external teeth 336 that is carried on and driven by the eccentric lobe 328. As will be explained in greater detail below, the internal teeth 332 of the first gear 330 are arranged in meshing engagement with the external teeth 336 of the second gear 334 such that rotation of the second gear 334 drives rotation of the first gear 330 and the pinion shaft 282. Although other configuration are possible, in the illustrated example, the first gear 330 is rotatably coupled to the pinion shaft 282 by splines 338. The eccentric lobe 328 has a first bearing surface 340 that is eccentric relative to the pinion shaft axis 284. The first bearing surface 340 has a first radius R1. The second gear 334 is rotatably supported on the first bearing surface 340 of the eccentric lobe 328. The second gear 334 has a central bore 342. The first bearing surface 340 of the eccentric lobe 328 extends through and contacts the central bore 342 of the second gear 334. There is a slip fit between the first bearing surface 340 of the eccentric lobe 328 and the central bore 342 of the second gear 334 such that the second gear 334 can freely rotate on the first bearing surface 340 of the eccentric lobe 328.

The first and second gears 330, 334 are meshingly engaged in a planetary arrangement where the second gear 334 travels in a planetary, wobbling motion within the first gear 330. Although different configuration are possible, the internal and external teeth 332, 336 of the first and second gears 330, 334 may have a cycloid profile. The first and second gears 330, 334 may be made of a variety of different materials. By way of example and without limitation, the first and second gears 330, 334 may be made of metal or powdered metal.

The second planetary gear set 291 includes a sun gear 206, a ring gear 208, and a plurality of planet gears 210. The sun gear 206 that is fixed to and rotates with the conical spiral gear 294 of the conical spiral gear set 288. More specifically, the sun gear 206 is formed in the hub portion 304 and is therefore made of powdered metal in the illustrated embodiment. The ring gear 208 is fixed to the gear box housing 216 by one or more fasteners 250. The ring gear 208 has an outer perimeter 211 with a non-circular shape. The fasteners 250 together with the complimentary, non-cylindrical shape of the gear box cavity 280 prevent the ring gear 208 from rotating within the gear box housing 216. Optionally, the gear box housing 216 may include one or more centering ramps 213 that help to properly center the ring gear 208 in the gear box housing 216 during assembly of the gear box 214. The planet gears 210 are disposed radially between and arranged in meshing engagement with the sun gear 206 and the ring gear 208. The planet gears 210 are supported on a carrier 215 that is fixed to and rotates with the eccentric lobe 328 of the first planetary gear set 290. The carrier 215 includes a plurality of pins 217. The planet gears 210 are carried on and rotate about these pins 217. When the sun gear 206 rotates, the planet gears 210 travel around inside the ring gear 208 in a circular path, which causes the carrier 215 to rotate and therefore drives rotation of the eccentric lobe 328.

The carrier 215 has a second bearing surface 344 that is cylindrical and co-axially arranged with the pinion shaft axis 284. The second bearing surface 344 has a second radius R2 that is smaller than the first radius R1 of the first bearing surface 340. Due to the size difference between R1 and R2 and the eccentric (i.e. off-set) arrangement of the first bearing surface 340, a hub slot 346 is formed in the carrier 215 on which a locking plate 348 is sliding supported and guided. The second bearing surface 344 and thus the hub slot 346 are not aligned with (i.e. are longitudinally offset relative to) the internal and external teeth 332, 336 of the first and second gears 330, 334. Accordingly, the locking plate 348 is longitudinally offset relative to the internal and external teeth 332, 336 of the first and second gears 330, 334 and does not contact or otherwise engage the internal or external teeth 332, 336 of the first and second gears 330, 334. Optionally, the first bearing surface 340 of the eccentric lobe 328 made have an inset region (not shown) that extends in an arc-shape reduce the surface area of the first bearing surface 340 and minimize friction.

The second gear 334 has first and second pins 350, 351 that extend longitudinally (i.e. parallel to the pinion shaft axis 284) from the second gear 334. The first and second pins 350, 351 are cylindrical in shape and are rigidly connected to one of the side faces of the second gear 334. The locking plate 348 has a fork-like shape and can be made from a variety of different materials. By way of example and without limitation, the locking plate 348 may be made of stamped steel. The locking plate 348 is transverse to the pinion shaft axis 284. The locking plate 348 has four slot cutouts 352, 354, 356, 357. The first slot cutout 352 is rectangular in shape and is closed on all four sides. The second, third, and fourth slot cutouts 354, 356, 357 have U-like shapes and are open on one side. A support pin 358 is rigidly fixed to the gear box housing 216. The support pin 358 is spaced from and extends parallel to the pinion shaft axis 284. The locking plate 348 is supported on and guided by the first and second pins 350, 351 on the second gear 334, the support pin 358, and the second bearing surface 344 of the carrier 215. The support pin 358 is received in and extends through the first slot cutout 352 in the locking plate 348. The second slot cutout 354 in the locking plate 348 bears against the second bearing surface 344 of the carrier 215. Because the second bearing surface 344 of the carrier 215 is co-axially aligned with the pinion shaft axis 284, the interfaces between the support pin 358 and the first slot cutout 352 and the second bearing surface 344 of the carrier 215 and the second slot cutout 354 restrict the locking plate 348 to a limited range of movement. The first and second pins 350, 351 on the second gear 334 are received in and extend through the third and fourth slot cutouts 356, 357 in the locking plate 348, respectively. The interfaces between the first and second pins 350, 351 on the second gear 334 and the third and fourth slot cutouts 356, 357 in the locking plate 348 restrict the movement of the second gear 334 to a planetary, wobbling motion and prevent the second gear 334 from rotating degrees. The interaction between the locking plate 348 and the first and second pins 350, 351 on the second gear 334, the support pin 358, and the second bearing surface 344 of the carrier 215 also prevent the pinion shaft 282 from rotating in either direction (i.e. clockwise or counter-clockwise) when the conical spiral gear 294 is not being driven by the conical pinion gear 292 and therefore provides anti-back drive capability.

Optionally, a first roller sleeve 360 may be fitted over the support pin 358. Similarly, second and third roller sleeves 362, 363 may optionally be fitted over the first and second pins 350, 351 on the second gear 334. The first, second, and third roller sleeves 360, 362, 363 may be sized to provide a slip fit between the support pin 358 and the first roller sleeve 360 and between the first and second pins 350, 351 on the second gear 334 and the second and third roller sleeves 362, 363 such that the first, second, and third roller sleeves 360, 362, 363 may be free to rotate on the support pin 358 and the first and second pins 350, 351 on the second gear 334. The first support pin 364 may optionally include knurled end 366 that is pressed into the gear box housing 216 such that the first support pin 364 is fixed and does not rotate relative to the gear box housing 216. An opposite end 368 of the first support pin 364 extends through the gear box cover 218. The first roller sleeve 360 may include a barrel 370 and a flange portion 372 and a thin metal shim 374 may be arranged between the flange portion 372 of the first roller sleeve 360 and the gear box housing 216. This arrangement therefore reduces friction losses, wear, and noise during operation of the seat adjuster drive 200. Although the first, second, and third roller sleeves 360, 362, 363 may be made of a variety of different materials, in one non-limiting example, the first, second, and third roller sleeves 360, 362, 363 are made from a self-lubricated plastic material or from a plastic material resistant to high temperature such as PEEK. As an alternative, the first, third, and fourth slot cutouts 352, 354, 356, 357 in the locking plate 348 may be covered by self-lubricated plastic sleeves (not shown) while the support pin 358 and the first and second pins 350, 351 on the second gear 334 slide along the self-lubricated plastic sleeves with or without the use of the first, second, and third roller sleeves 360, 362, 363.

Regardless of whether the first, second, and third roller sleeves 360, 362, 363 or some other alternative is utilized, it should be appreciated that the geometry of the support pin 358 and the first and second pins 350, 351 on the second gear 334 significantly reduces friction losses. The cylindrical shape of the support pin 358 and the first and second pins 350, 351 on the second gear 334 minimizes the contact area between the support pin 358 and the first slot cutout 352 and between the first and second pins 350, 351 on the second gear 334 and the third and fourth slot cutouts 356, 357 in the locking plate 348 to either line or point contacts. This improves the mechanical efficiency of the gear box 214.

The interfaces between the locking plate 348, the first and second pins 350, 351 on the second gear 334, the support pin 358, and the second bearing surface 344 of the carrier 215 synchronize the reciprocating motion of the locking plate 348 with the planetary, wobbling motion of the second gear 334. The planetary, wobbling motion of the second gear 334 follows a circular path where the external teeth 336 of the second gear 334 mesh with the internal teeth 332 of the first gear 330, forcing the first gear 330 and therefore the pinion shaft 282 to rotate with a uniform rotational speed about the pinion shaft axis 284 in the same direction of rotation as the direction of rotation of the eccentric lobe 328.

In order to maintain the position of the conical spiral gear 294 on the pinion shaft 282 in a position where the first bearing surface 340 of the eccentric lobe 328 is longitudinally aligned with the second gear 334, a spring plate assembly 378 is provided on the pinion shaft 282 longitudinally between the eccentric lobe 328 and the first gear 330.

The spring plate assembly 378 includes a washer cup 380 and an O-ring 382. The O-ring 382 is made of a resilient material, such as rubber, which can expand and compress to dampen small longitudinal movements of the conical spiral gear 294 on the pinion shaft 282. A bearing sleeve 376 is positioned on the opposite side of the first gear 330 and radially between a portion of the first gear 330 and the gear box cover 218. The bearing sleeve 376 is made from a low-friction material such as a self-lubricated plastic material and therefore permits the first gear 330 to rotate within the gear box cavity 280 with minimal wear to the gear box cover 218.

Any attempt of the first gear 330 to back-drive the second gear 334 due to an external torque load acting on the pinion 220, resulting for example from a collision, is prevented through a reaction moment created by contact forces acting between the first slot cutout 352 of the locking plate 348 and the support pin 358, the second slot cutout 354 and the second bearing surface 344 of the hub portion 304, and the third and fourth slot cutouts 356, 357 of the locking plate 348 and the first and second pins 350, 351 of the second gear 334. Because the support pin 358 and the second bearing surface 344 of the hub portion 304 limit the movement of the locking plate 348, the first gear 330 cannot back drive the second gear 334, and accordingly the eccentric lobe 328, in a counter-clockwise direction. This protects the electric motor 212 from damage and prevents external forces from changing the longitudinal (i.e., fore-aft) position of the vehicle seat, such as during a crash event. Greater detail regarding the anti-back drive capability of the locking plate 348 is described in U.S. Pat. No. 9,902,295, which is expressly incorporated herein by reference.

FIGS. 18-21 illustrate another seat adjuster drive 200' that shares many of the same components as the seat adjuster drive 200 shown in FIGS. 14-17. Components shared between these two embodiments have like reference numbers, while the components that are different in the seat adjuster drive 200' shown in FIGS. 18-21 are designated with an apostrophe (') after the reference number. The description set forth above applies equally to all components shared between the seat adjuster drive 200 shown in FIGS. 14-17 and the seat adjuster drive 200' shown in FIGS. 18-21; however, in the later, the locking plate 348 has been eliminated. In its place, the seat adjuster drive 200' includes first and second support pins 364', 365' that are fixed relative to gear box housing 216' of gear box 214'. The first and second support pins 364', 365' are spaced from and extend parallel to the pinion shaft axis 284. The first support pin 364' extends between a first support pin end 386' and a second support pin end 388'. The second support pin 365' extends between a third support pin end 390' and a fourth support pin end 392'. The first and second support pins 364', 365' are rigidly fixed within the gear box housing 216 at the first and third support pin ends 386', 390' and are rigidly fixed within holes 394' in the gear box cover 218' at the second and fourth support pin ends 388', 392'.

Second gear 334' includes an external flange 396' that is provided with first and second guide holes 398', 399'. The external flange 396' extends outwardly from the external teeth 336' of the second gear 334' in a plane that is transverse to the pinion shaft axis 284. The external flange 396' may be integrally formed as part of the second gear 334' or may be a separately formed component that is rotatably fixed to the part of the second gear 334' that includes the external teeth 336'. The first and second guide holes 398', 399' extend through the external flange 396' of the second gear 334'. The first and second support pins 364', 365' are received in and extend through the first and second guide holes 398', 399' in the external flange 396' of the second gear 334', respectively. The first and second guide holes 398', 399' have first and second guide hole radii and the first and second support pins 364', 365' have first and second support pin radii that are smaller than the first and second guide hole radii. In accordance with one example, the first guide hole radius may equal the sum of the first support pin radius and the eccentricity of the eccentric lobe 328 and the second guide hole radius may equal the sum of the second support pin radius and the eccentricity eccentric lobe 328. The size relationship between the first and second guide hole radii and the first and second support pin radii permits the second gear 334' to move freely in a planetary, wobbling movement relative to the pinion shaft axis 284 when the eccentric lobe 328 is rotatably driven. As will be explained in greater detail below, contact between the first bearing surface 340 of the eccentric lobe 328 and the second gear 334', the first support pin 364' and the first guide hole 398' in the external flange 396', and the second support pin 365' and the second guide hole 399' in the external flange 396' prevents the first gear 330 from back-driving rotation of the second gear 334.

The first and second support pins 364', 365' and the first and second guide holes 398', 399' of the external flange 396' form two crank-rocker type parallelogram mechanisms about the pinion shaft axis 284. The interfaces between the first and second support pins 364', 365' on the second gear 334 and the first and second guide holes 398', 399' in the external flange 396' restrict the movement of the second gear 334 to a planetary, wobbling motion and prevent the second gear 334 from rotating 360 degrees. The interaction between the first and second support pins 364', 365' and the first and second guide holes 398', 399' in the external flange 396' of the second gear 334 and the interaction of the first bearing surface 340 of the eccentric lobe 328 and the second gear 334' prevents the pinion shaft 282 from rotating in either direction (i.e. clockwise or counter-clockwise) when the eccentric lobe 328 is not being driven by the electric motor 212 and therefore provides anti-back drive capability.

Optionally, first and second roller sleeves 360', 362' may be fitted over the first and second support pins 364', 365'. The first and second roller sleeves 360', 362' may be sized to provide a slip fit between the first and second support pins 364', 365' and the first and second roller sleeves 360', 362' such that the first and second roller sleeves 360', 362' are free to rotate on the first and second support pins 364', 365'. This arrangement therefore reduces friction losses, wear, and noise during operation of the seat adjuster drive 200'. Although the first and second roller sleeves 360', 362' may be made of a variety of different materials, in one non-limiting example, the first and second roller sleeves 360', 362' are made from a self-lubricated plastic material or from a plastic material resistant to high temperature such as PEEK. As an alternative, the first and second guide holes 398', 399' in the external flange 396' of the second gear 334' may be covered by self-lubricated plastic sleeves (not shown) while the first and second support pins 364', 365' slide along the self-lubricated plastic sleeves with or without the use of the first and second roller sleeves 360', 362'.

Regardless of whether the first and second roller sleeves 360', 362' or some other alternative are utilized, it should be appreciated that the geometry of the first and second support pins 364', 365' and the first and second guide holes 398', 399' in the external flange 396' of the second gear 334' significantly reduces friction losses. The cylindrical shape of the first and second support pins 364', 365' minimizes the contact area between the first and second support pins 364', 365' and the first and second guide holes 398', 399' to either line or point contacts. This results in improved mechanical efficiency.

The second gear 334' moves in a planetary, wobbling motion within gear box cavity 280' along a circular eccentric path where the second gear 334' does not rotate about its own centerline. During the planetary, wobbling motion of the second gear 334', the external teeth 336' of the second gear 334' mesh with the internal teeth 332 of the first gear 330, forcing the first gear 330 and the pinion shaft 282 to rotate with an uniform rotational speed about the pinion shaft axis 284 in the same direction of rotation as the direction of rotation of the eccentric lobe 328.

Any attempt of the first gear 330 to drive rotation of the second gear 334' due to an external torque load acting on the pinion 220, resulting for example from a collision, is prevented through a reaction moment created by contact forces acting between the second gear 334' and the first bearing surface 340 of the eccentric lobe 328 and contact forces acting between the first and second support pins 364', 365' and the first and second guide holes 398', 399' in the external flange 396' of the second gear 334'. The second gear 334' is held on its eccentric path relative to the pinion shaft axis 284 through the engagement of the external teeth 336' of the second gear 334' with the internal teeth 332 of the first gear 330. The contact forces prevent both backwards rotation of the pinion shaft 282, thereby protecting the electric motor 212 from damage and prevents external forces from changing the longitudinal (i.e., fore-aft) position of the vehicle seat, such as during a crash event. Greater detail regarding the anti-back drive capability of this arrangement is described in U.S. Pat. No. 10,024,392, which is expressly incorporated herein by reference.

Typically, the mesh between the teeth of output pinion 20, 220 and rack 26, 226 are designed with some amount of backlash, in order to prevent possible flank interferences due to deviation from ideal geometries, unfavourable deformations and temperature effects while in operation. During the mesh, a combined rolling and sliding movement is experienced between the teeth in contact. However, for some applications the amount of backlash is required to be as small as possible, or ideally, zero-backlash. Such applications require very precisely manufactured components and an accurate assembly process, which can result in a relatively high cost. One example of a zero-backlash gear system is a gear pair that has a double-flank action. A double-flank action gear system is typically mounted with an initial pre-stress and such a system only works properly if the pre-stress is small and controllable. If the pre-stress is significant and/or fluctuating, adverse functional consequences can be expected. For example, excessive or fluctuating pre-stress can result in the following problems: mesh noise caused by excessive variation of the sliding friction, excessive wear on gear components teeth, possible mesh interferences, and even the jam of components.

FIGS. 22 and 23 illustrate an alternative seat adjuster drive 400, which is similar to the seat adjuster drive assemblies 100, 100', 200, 200' shown in FIGS. 1-21, but includes a different rack and pinion drive assembly 430 that provides minimal or zero backlash. The rack and pinion drive assembly 430 includes a pinion 420 mounted on the pinion bearing 24. The pinion 420 is a conical involute-type pinion that includes pinion teeth 468 that form a teeth pitch cone 470 that is arranged at an inclined angle δ relative to the pinion shaft axis 84. The pinion teeth 468 are arranged in meshing engagement with a rack 426. The rack 426 has regular involute rack teeth 428 that are inclined at the same angle δ relative to a rack base surface 429, which is in a plane that is parallel to the pinion shaft axis 84. It should be appreciated that the teeth pitch cone 470 is defined by the line contacts, at the mesh points, between the pinion teeth 468 and the rack teeth 428. By simply adjusting the axial position of the seat adjuster drive assembly 400 along the y-axis 62 relative to the fixed rack 426 during the assembly process, the pre-stress forces between the pinion teeth 468 and the rack teeth 428 can be adjusted and maintained in a predefined range. The resulting rack and pinion drive assembly 430 combines all benefits provided by a conical involute gear system, capable of double-flank action, with this simple assembly process. In addition, the rack and pinion drive assembly 430 is capable of easily handling the large loads and torques encountered in vehicle seat applications and can fit into a very compact packaging space.

Figure 25:
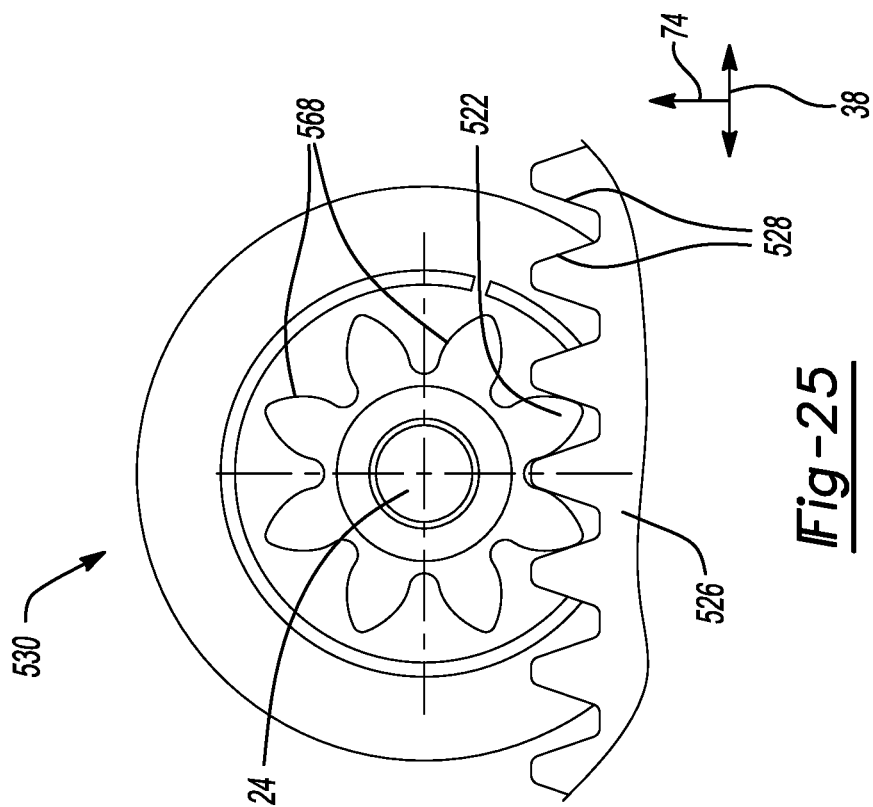
FIG. 25 is an enlarged side elevation view of the exemplary seat adjuster drive shown in FIG. 24.
Figure 24:
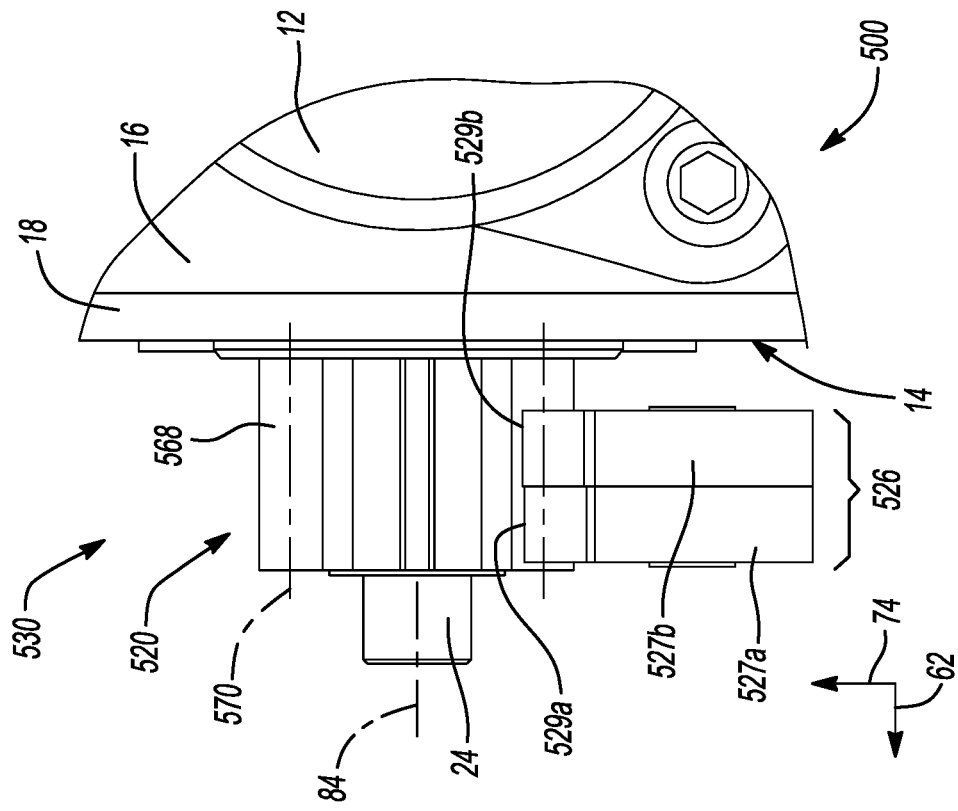
FIG. 24 is an enlarged rear elevation view of another exemplary seat adjuster drive that includes a different rack and pinion drive assembly mated to the gear box of the exemplary seat adjuster drive shown in FIG. 5, which includes a two-part rack mesh.
Figure 26:
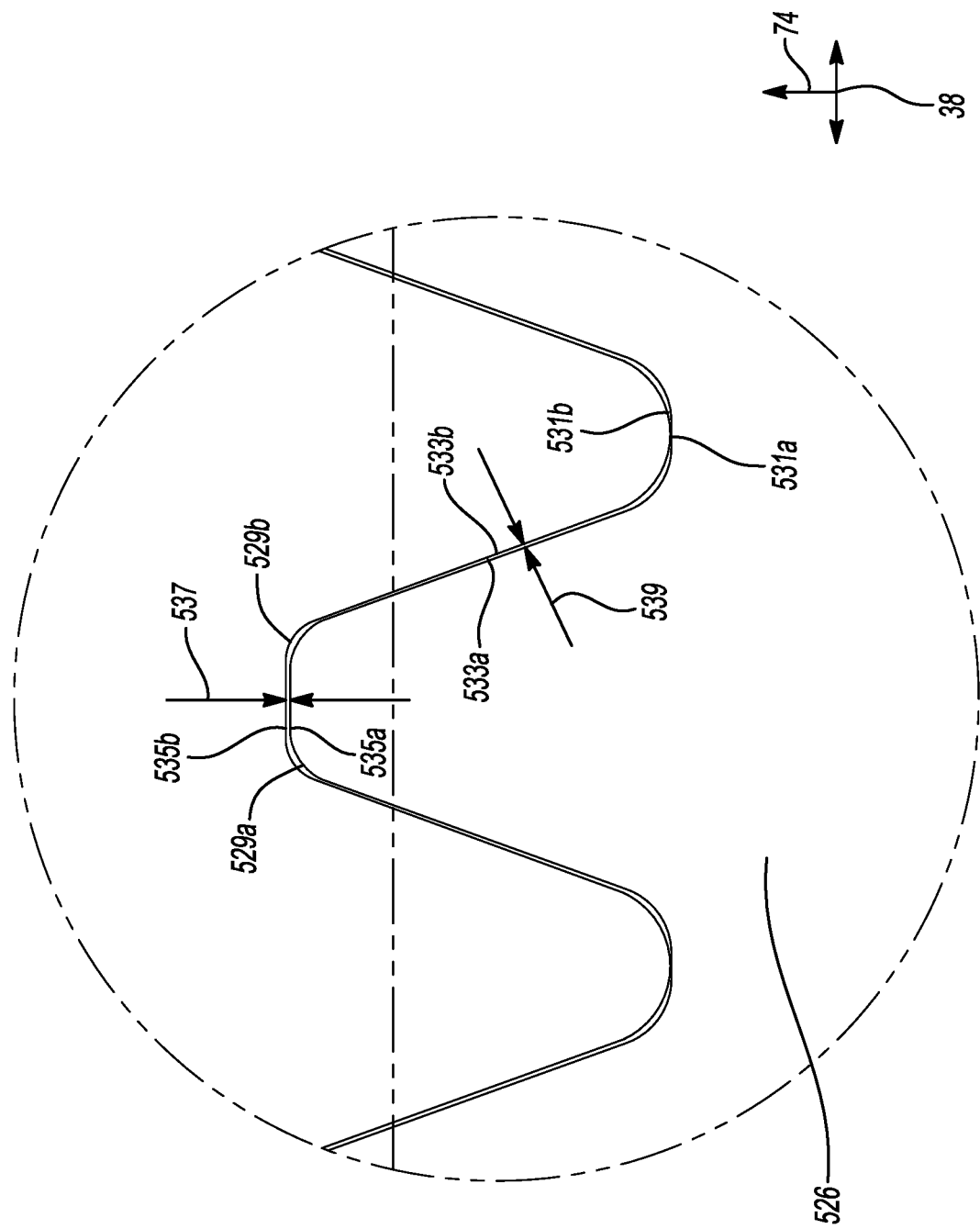
FIG. 26 is an enlarged side elevation view of the two-part rack mesh exemplary seat adjuster drive shown in FIG. 24.

FIGS. 24-26 illustrate another alternative seat adjuster drive 500, which is similar to the seat adjuster drive assemblies 100, 100', 200, 200' shown in FIGS. 1-21, but includes a different rack and pinion drive assembly 530 that provides minimal or zero backlash. The rack and pinion drive assembly 530 includes a pinion 520 mounted on the pinion bearing 24. The pinion 520 is a cylindrical involute-type pinion that includes pinion teeth 568. The pinion teeth 568 are arranged in meshing engagement with a rack 526. The rack 526 has regular involute rack teeth 528. The pinion teeth 568 and the rack teeth 528 are arranged in a meshing engagement where the line contacts 570, at the mesh points, between the pinion teeth 568 and the rack teeth 528 are parallel to the pinion shaft axis 84. The rack 526 is a two-part assembly comprising a first rack part 527a that defines a first set of teeth profiles 529a and a second rack part 527b that defines a second set of teeth profiles 529b. The first and second rack parts 527a, 527b are arranged such that the first set of teeth profiles 529a of the first rack part 527a are slightly offset relative to the second set of teeth profiles 529b of the second rack part 529b. Although other configurations are possible, the first and second rack parts 527a, 527b may be made of steel or another suitable metal.

The first set of teeth profiles 529a define a root 531a, flank 533a, and peak 535a for each of the rack teeth 528. Similarly, the second set of teeth profiles 529b define another root 531b, flank 533b, and peak 535b for each of the rack teeth 528. Due to the offset between the first set of teeth profiles 529a and the second set of teeth profiles 529b, each peak 535a defined by the first set of teeth profiles 529a is offset relative to each peak 535b defined by the second set of teeth profiles 529b by a peak offset distance 537 and each flank 533a defined by the first set of teeth profiles 529a is offset relative to each flank 533b defined by the second set of teeth profiles 529b by a flank offset distance 539. The peak offset distance 537 is measured parallel to the z-axis 74, while the flank offset distance 539 is tangential to the flanks 533a, 533b and is therefore measured at an angle to both the fore-and-aft direction 38 and the z-axis 74. However, each root 531a defined by the first set of teeth profiles 529a has no (i.e., zero) offset relative to each root 531b defined by the second set of teeth profiles 529b. The offset may be very small. By way of example and without limitation, the peak offset distance 537 may equal 0.05 millimeters (mm) and the flank offset distance 539 may equal 0.015 millimeters (mm). The offset arrangement between the first and second rack parts 527a, 527b is relatively inexpensive, takes out the play between the pinion teeth 568 and the rack teeth 528, and assure a minimum interference in mesh. The offset arrangement creates a small mesh interference between the rack 526 and the cylindrical-involute pinion 520, resulting in a gear system that reduces or eliminates radial free-play and will work with a radial controlled pre-stress.

Figure 29:
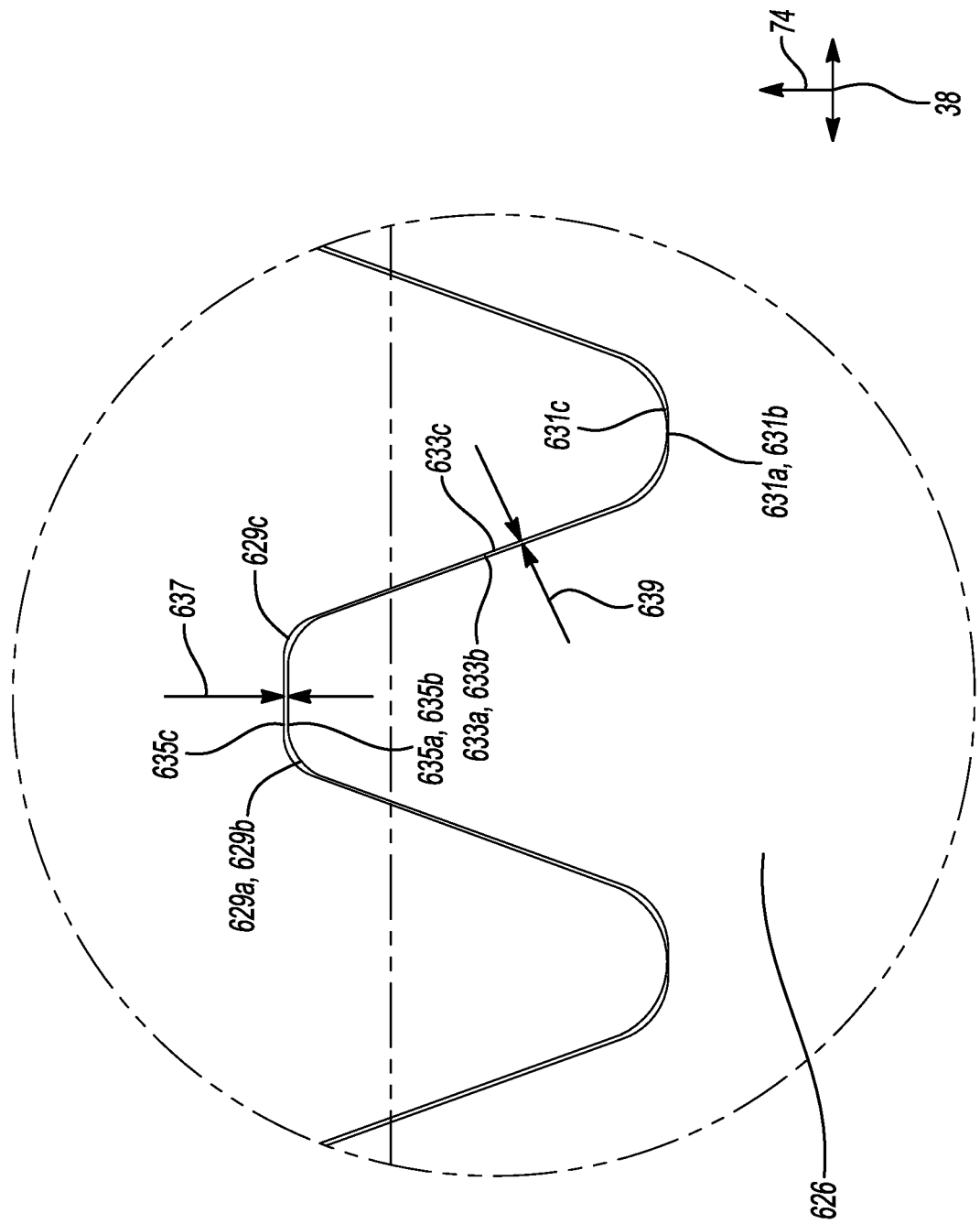
FIG. 29 is an enlarged side elevation view of the three-part rack mesh exemplary seat adjuster drive shown in FIG. 27.

FIGS. 27-29 illustrate another alternative seat adjuster drive 600, which is similar to the seat adjuster drive assemblies 100, 100', 200, 200' shown in FIGS. 1-21, but includes a different rack and pinion drive assembly 630 that provides minimal or zero backlash. The rack and pinion drive assembly 630 includes a pinion 620 mounted on the pinion bearing 24. The pinion 620 is a cylindrical involute-type pinion that includes pinion teeth 668. The pinion teeth 668 are arranged in meshing engagement with a rack 626. The rack 626 has regular involute rack teeth 628. The pinion teeth 668 and the rack teeth 628 are arranged in a meshing engagement where the line contacts 670, at the mesh points, between the pinion teeth 668 and the rack teeth 628 are parallel to the pinion shaft axis 84. The rack 626 is a three-part assembly comprising a first rack part 627a that defines a first set of teeth profiles 629a, a second rack part 627b that defines a second set of teeth profiles 629b, and a third rack part 627c that defines a third set of teeth profiles 629c. The first and second rack parts 627a, 627b are arranged such that the first set of teeth profiles 629a of the first rack part 627a and the second set of teeth profiles 629b of the second rack part 627b are slightly offset relative to the third set of teeth profiles 629c of the third rack part 627c. Although other configuration are possible, the first and second rack parts 627a, 627b may be made of steel or another suitable metal while the third rack part 627c is made of plastic or another suitable polymer.

The first set of teeth profiles 629a define a root 631a, flank 633a, and peak 635a for each of the rack teeth 628. Similarly, the second set of teeth profiles 629b define another root 631b, flank 633b, and peak 635b for each of the rack teeth 628 and the third set of teeth profiles 629c define another root 631c, flank 633c, and peak 635c for each of the rack teeth 628. Because the first set of teeth profiles 629a and the second set of teeth profiles 629b are offset from the third set of teeth profiles 629c, each peak 635a, 635b defined by the first set of teeth profiles 629a and the second set of teeth profiles 629b is offset relative to each peak 635c defined by the third set of teeth profiles 629c by a peak offset distance 637 and each flank 633a, 633b defined by the first set of teeth profiles 629a and the second set of teeth profiles 629b is offset relative to each flank 633c defined by the third set of teeth profiles 629c by a flank offset distance 639. The peak offset distance 637 is measured parallel to the z-axis 74, while the flank offset distance 639 is tangential to the flanks 633a, 633b, 633c and is therefore measured at an angle to both the fore-and-aft direction 38 and the z-axis 74. However, each root 631a, 631b defined by the first set of teeth profiles 629a and the second set of teeth profiles 629b has no (i.e., zero) offset relative to each root 631c defined by the third set of teeth profiles 629c. The offset may be very small. By way of example and without limitation, the peak offset distance 537 may equal 0.05 millimeters (mm) and the flank offset distance 639 may equal 0.015 millimeters (mm). This arrangement takes out the play between the pinion teeth 668 and the rack teeth 628, assures a minimum interference in mesh, and can the reduce noise and weight of the rack and pinion drive assembly 630. The offset arrangement creates a small mesh interference between the rack 626 and the cylindrical-involute pinion 620, resulting in a gear system that reduces or eliminates radial free-play and will work with a radial controlled pre-stress.

Many modifications and variations of the present disclosure are possible in light of the above teachings and may be practiced otherwise than as specifically described while within the scope of the appended claims. For example, and without limitation, the features of the various embodiments described herein may be combined in a variety of different configurations than those shown without departing from the scope of the present disclosure. Moreover, it should be appreciated that all of the seat adjuster drives 100, 100', 200, 200', 400, 500, 600 described herein can be easily adapted for use in configurations where the rack 26, 226, 426, 526, 626 is mounted outside stationary track 32 or inside the stationary track 232. These antecedent recitations should be interpreted to cover any combination in which the inventive novelty exercises its utility.

What is claimed is:

1. A vehicle comprising:
a vehicle seat; and
a seat adjuster drive comprising:
a stationary track configured to be fixed to a sub-floor of the vehicle;
a sliding track that is arranged in sliding engagement with said stationary track for movement in fore and aft directions, wherein said vehicle seat is mounted to said sliding track;
a gear box mounted to said sliding track;
a rack and pinion drive assembly including a pinion and a rack extending longitudinally along said stationary track;
said pinion including a pinion shaft and a gear portion, said pinion shaft extending into said gear box along a pinion shaft axis and said gear portion arranged in meshing engagement with said rack such that rotation of said pinion drives said sliding track in said fore and aft directions;
an electric motor mounted to said gear box, said electric motor having an output shaft;
said gear box including a gear box housing that defines a gear box cavity therein;
a conical spiral gear set, disposed within said gear box cavity, including a conical pinion gear that is coupled to said output shaft of said electric motor such that said conical pinion gear is configured to rotate about a conical pinion gear axis and a conical spiral gear, arranged in meshing engagement with said conical pinion gear, that is carried on said pinion shaft in a sliding fit;
at least one planetary gear set, disposed within said gear box cavity, that rotatably couples said conical spiral gear and said pinion through a gear reduction; and
said conical spiral gear set being arranged within said gear box such that said conical pinion gear axis intersects said pinion shaft axis,
wherein said sub-floor of the vehicle is disposed beneath and spaced apart from a floor of the vehicle, and wherein said seat adjuster drive is configured to be installed between said floor and said sub-floor of the vehicle,
wherein said at least one planetary gear set includes a first planetary gear set, disposed within said gear box cavity, comprising an eccentric lobe carried on said pinion shaft in a sliding fit, a first gear with internal teeth that is rotatably coupled to said pinion shaft, and a second gear with external teeth that is carried on and is configured to be driven by said eccentric lobe, said internal teeth of said first gear being arranged in meshing engagement with said external teeth of said second gear such that rotation of said second gear drives rotation of said first gear and said pinion shaft, wherein said seat adjuster drive further comprises:
- a locking plate disposed within said gear box cavity and including a first slot cutout, a second slot cutout, and a third slot cutout;
- a support pin fixed to said gear box housing that is parallel to and spaced from said pinion shaft axis and that extends through said first slot cutout in said locking plate;
- said eccentric lobe extending through said second slot cutout in said locking plate where said eccentric lobe and said support pin cooperate to support said locking plate within said gear box cavity and limit movement of said locking plate relative to said gear box housing to movement along a lateral axis that is transverse to said pinion shaft axis; and
- said second gear including a first pin that is spaced from and parallel to said pinion shaft axis where said first pin extends through said third slot cutout in said locking plate and prevents said first gear from driving rotation of said second gear.

2. The vehicle of claim 1, wherein said conical pinion gear axis intersects said pinion shaft axis at a perpendicular angle.

3. The vehicle of claim 2, wherein said conical pinion gear axis is spaced from and runs parallel to said stationary track and said pinion shaft axis is perpendicular to said stationary track.

4. The vehicle of claim 1, wherein said eccentric lobe of said first planetary gear set is fixed to and is configured to rotate with said conical spiral gear of said conical spiral gear set.

5. A seat adjuster drive for a vehicle, comprising:
a gear box;
a rack and pinion drive assembly, including a rack extending in a longitudinal direction and a pinion;
said pinion including a pinion shaft and a gear portion, said pinion shaft extending into said gear box along a pinion shaft axis and said gear portion arranged in meshing engagement with said rack;
a conical spiral gear set, disposed within said gear box, including a conical pinion gear that is configured to rotate about a conical pinion gear axis and a conical spiral gear, arranged in meshing engagement with said conical pinion gear, that is carried on said pinion shaft in a sliding fit;
at least one planetary gear set, disposed within said gear box, that rotatably couples said conical spiral gear and said pinion through a gear reduction, said at least one planetary gear set including an eccentric lobe and a first gear, wherein said eccentric lobe is carried on said pinion shaft in a sliding fit, and wherein said first gear includes internal teeth and is rotatably coupled to said pinion shaft;
said conical spiral gear set being arranged within said gear box such that said conical pinion gear axis intersects said pinion shaft axis; and
a spring plate assembly disposed within said gear box and including a washer cup and an O-ring, wherein said spring plate assembly is disposed on said pinion shaft between said eccentric lobe and said first gear.

6. The seat adjuster drive of claim 5, wherein said rack includes a plurality of rack teeth and said pinion includes a plurality of pinion teeth.

7. The seat adjuster drive of claim 6, wherein said rack and pinion drive assembly has a cylindrical configuration where said rack teeth and said pinion teeth meshingly engage along line contacts that extend parallel to said pinion shaft axis.

8. The seat adjuster drive of claim 6, wherein said rack and pinion drive assembly has a conical involute configuration where said rack teeth and said pinion teeth meshingly engage along line contacts that extend at an inclined angle relative to said pinion shaft axis.

9. The seat adjuster drive of claim 6, wherein said rack includes a first rack part that defines a first set of teeth profiles and a second rack part that defines a second set of teeth profiles and wherein said first set of teeth profiles are offset relative to said second set of teeth profiles.

10. The seat adjuster drive of claim 9, wherein said first set of teeth profiles define a root, a flank, and a peak for each of said rack teeth, wherein said second set of teeth profiles define another root, another flank, and another peak for each of said rack teeth, wherein each peak defined by said first set of teeth profiles is offset relative to each peak defined by said second set of teeth profiles by a peak offset distance, and wherein each flank defined by said first set of teeth profiles is offset relative to each flank defined by said second set of teeth profiles by a flank offset distance.

11. The seat adjuster drive of claim 10, wherein said peak offset distance is measured parallel to a z-axis, wherein said flank offset distance is measured tangentially to said flanks defined by said first set of teeth profiles and said second set of teeth profiles, and wherein each root defined by said first set of teeth profiles has zero offset relative to each root defined by said second set of teeth profiles.

12. The seat adjuster drive of claim 6, wherein said rack includes a first rack part that defines a first set of teeth profiles, a second rack part that defines a second set of teeth profiles, and a third rack part that defines a third set of teeth profiles and wherein said first set of teeth profiles and said second set of teeth profiles are offset relative to said third set of teeth profiles.

13. The seat adjuster drive of claim 12, wherein said first set of teeth profiles define a root, a flank, and a peak for each of said rack teeth, wherein said second set of teeth profiles define another root, another flank, and another peak for each of said rack teeth, wherein said third set of teeth profiles define yet another root, yet another flank, and yet another peak for each of said rack teeth, wherein each peak defined by said first set of teeth profiles and said second set of teeth profiles is offset relative to each peak defined by said third set of teeth profiles by a peak offset distance, and wherein each flank defined by said first set of teeth profiles and said second set of teeth profiles is offset relative to each flank defined by said third set of teeth profiles by a flank offset distance.

14. The seat adjuster drive of claim 13, wherein said peak offset distance is measured parallel to a z-axis, wherein said flank offset distance is measured tangentially to said flanks defined by said first set of teeth profiles and said second set of teeth profiles, and wherein each root defined by said first set of teeth profiles and said second set of teeth profiles has zero offset relative to each root defined by said third set of teeth profiles.

15. The seat adjuster drive of claim 12, wherein said first and second rack parts are made of metal and said third rack part is made of a polymer.

16. The seat adjuster drive of claim 5, wherein said first planetary gear set, disposed within said gear box, further comprises a second gear with external teeth that is carried on and is configured to be driven by said eccentric lobe, said internal teeth of said first gear being arranged in meshing engagement with said external teeth of said second gear such that rotation of said second gear drives rotation of said first gear and said pinion shaft.

17. The seat adjuster drive of claim 16, wherein said at least one planetary gear set includes a second planetary gear set, disposed within said gear box, comprising a sun gear that is fixed to and is configured to rotate with said conical spiral gear of said conical spiral gear set, a ring gear that is fixed to said gear box, and a plurality of planet gears that are disposed radially between and arranged in meshing engagement with said sun gear and said ring gear, said plurality of planet gears being supported on a carrier that is fixed to and is configured to rotate with said eccentric lobe of said first planetary gear set.

18. The seat adjuster drive of claim 16, wherein said second gear includes an external flange with first and second guide holes that extend through said external flange.

19. The seat adjuster drive of claim 18, further comprising:
- a first support pin fixed to said gear box that is parallel to said pinion shaft axis, is cylindrical in shape, and extends through said first guide hole in said external flange of said second gear;
- a second support pin fixed to said gear box that is parallel to said pinion shaft axis, is cylindrical in shape, and extends through said second guide hole in said external flange of said second gear; and
- said first and second guide holes having first and second guide hole radii and said first and second support pins having first and second support pin radii that are smaller than said first and second guide hole radii such that said second gear is free to move in a planetary, wobbling movement about said pinion shaft axis in response to rotation of said eccentric lobe while contact between said eccentric lobe and said second gear, contact between said first support pin and said first guide hole of said external flange, and contact between said second support pin and said second guide hole of said external flange prevents said first gear from driving rotation of said second gear.

\* \* \* \* \*